(12) United States Patent
Shaked

(10) Patent No.: US 11,531,684 B2
(45) Date of Patent: Dec. 20, 2022

(54) SESSION-LEVEL READ YOUR WRITES CONSISTENCY AMONG DIGITAL DATA VERSIONS IN A DISTRIBUTED NETWORK

(71) Applicant: Meta Platforms, Inc., Menlo Park, CA (US)

(72) Inventor: Nitzan Shaked, Herzeliya (IL)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/180,732

(22) Filed: Feb. 20, 2021

(65) Prior Publication Data

US 2022/0269693 A1 Aug. 25, 2022

(51) Int. Cl.
*G06F 16/00* (2019.01)
*G06F 16/27* (2019.01)
*G06F 16/23* (2019.01)

(52) U.S. Cl.
CPC .......... *G06F 16/27* (2019.01); *G06F 16/2379* (2019.01)

(58) Field of Classification Search
CPC ............................ G06F 16/27; G06F 16/2379
See application file for complete search history.

(56) References Cited

U.S. PATENT DOCUMENTS

| | | | | |
|---|---|---|---|---|
| 2007/0061467 A1* | 3/2007 | Essey | .................... | G06Q 30/06 709/227 |
| 2010/0228788 A1* | 9/2010 | Eberlein | ............ | G06F 16/2315 707/802 |
| 2013/0066952 A1* | 3/2013 | Colrain | ............... | G06F 11/1438 709/203 |
| 2014/0229531 A1* | 8/2014 | Neel | .................... | G06F 11/1443 709/203 |
| 2016/0364440 A1 | 12/2016 | Lee et al. | | |
| 2017/0300520 A1* | 10/2017 | Goel | ........................ | G06F 16/24 |
| 2020/0258166 A1* | 8/2020 | Cross | ................... | G06F 21/6209 |
| 2020/0394154 A1 | 12/2020 | Blackshear et al. | | |
| 2020/0396299 A1* | 12/2020 | Mitsov | .................. | H04L 67/146 |

OTHER PUBLICATIONS

Cooper B.F., et al., "PNUTS : Yahoo!'s Hosted Data Serving Platform," Proceedings of the VLDB Endowment, Aug. 1, 2008, vol. 1, No. 2, pp. 1277-1288.

(Continued)

*Primary Examiner* — Khanh B Pham
(74) *Attorney, Agent, or Firm* — Keller Preece PLLC

(57) ABSTRACT

The present disclosure relates to systems, non-transitory computer-readable media, and methods for consistently providing accurate versions of digital data within a distributed server network utilizing session-level user tokens. For example, in one or more embodiments, the disclosed systems generate a session-level user token that is specific to a client computing device participating in a session and in response to receiving a write request from the client computing device. As the client computing device initiates additional requests to read and write digital data from the distributed server network during the session, the disclosed systems maintain current version information within the session-level user token, and utilize this version information to verify that data provided to the client computing device from the distributed server network is accurate at the session-level.

20 Claims, 10 Drawing Sheets

(56) References Cited

OTHER PUBLICATIONS

European Search Report for European Patent Application No. 22157066.6, dated Jun. 9, 2022, 6 pages.
Roohitavaf M., et al., "Session Guarantees with Raft and Hybrid Logical Clocks," Distributed Computing and Networking, Jan. 4, 2019, pp. 100-109.
Sivasubramanian S., et al., "Replication for Web Hosting Systems," ACM Computing Surveys, Sep. 1, 2004, vol. 36, No. 3, pp. 291-334.

* cited by examiner

SESSION-LEVEL READ YOUR WRITES CONSISTENCY AMONG DIGITAL DATA VERSIONS IN A DISTRIBUTED NETWORK

BACKGROUND

Recent years have seen significant improvements in globally distributed computer networks. For example, conventional networking systems now mirror data across servers distributed in countries throughout the world. For example, distributed digital ledger networks can maintain a cryptographic digital ledger and securely execute digital transactions across thousands of node computing devices that interact with other distributed servers in managing interactions with various client devices. In response to a request, conventional systems identify and access required data to address the request across such distributed networks.

Although conventional networking systems can maintain and provide data in connection with distributed networks, such systems have a number of problems in relation to efficiency and accuracy of operation. For instance, conventional systems encounter efficiency issues when requested data is not available on the same server that receives the data request. To illustrate, conventional data consistency systems function in connection with distributed networks of storage servers where data is periodically mirrored across storage servers. In order to account for mirroring latency, many conventional systems wait several cycles prior to responding to data requests. This, in turn, leads to system-wide slowdowns as client devices wait for required data to be available to the server serving the request.

Instead of waiting for all servers to include mirrored data, some systems utilize a central repository of version and/or status indicators that can be accessed by remote servers. For example, a query server can initiate a call to a version/status server to determine the most up-to-date data set. The query server can then respond to a client device based on whether the query server has access to the most up-to-date information. This approach also wastes significant time and computer resources in that it requires each query server to initiate a separate call, wait for a response, and then process the response before providing data to a requesting client device.

Moreover, conventional systems are often inaccurate. For example, rather than waiting to account for mirroring latency, some conventional systems respond to data requests with locally available data. This, however, leads to data inaccuracies when the locally available data is out of date. For example, in many scenarios, distributed systems update data at one server, and then mirror those updates to other servers over time. Thus, when a non-updated server receives a request that requires the data and that request is received prior to a mirrored update, that server responds to client device queries with out-of-date and inaccurate data. This is particularly problematic in applications that provide sensitive data—such as digital assets or transactions maintained via a distributed digital ledger network. Using conventional systems, client devices that write data to a first server and then navigate to a different user interface (or update a user interface) will often access, receive, and display inaccurate data from a second server that does not reflect the data written.

Conventional systems, then, generally choose between three non-optimal choices: either written data is replicated to all servers before a request completes, guaranteeing accurate subsequent reads but creating a write-throughput bottleneck; or writes do not wait for complete replication and subsequent reads consult a central repository, guaranteeing accurate subsequent reads but creating a read-throughput bottleneck; or writes do not wait for complete replication and reads do not consult a central repository, creating no bottlenecks but returning often inaccurate data.

These, along with additional problems and issues, exist with regard to conventional data consistency systems.

BRIEF SUMMARY

Embodiments of the present disclosure provide benefits and/or solve one or more of the foregoing or other problems in the art with systems, non-transitory computer-readable media, and methods that consistently provide accurate versions of digital data across requests of a session within a distributed server network. For example, the disclosed system can provide consistent data across various requests within a session so that a user is guaranteed to accurately read previous write data submitted within the session. By focusing on this session-level boundary for data consistency, the disclosed systems can solve the various problems associated with the prior art, thus avoiding unnecessary delays associated with global data mirroring systems, inefficiencies caused by centralized version storage approaches, and inaccuracies associated with systems that provide uncoordinated data from different servers.

In one or more embodiments, the disclosed systems can provide this session-level read-your-writes guarantee by generating and managing session-level user tokens. In particular, the disclosed systems can generate a session-level user token and associate the session-level user token with requests across any particular session. To illustrate, the disclosed systems can manage the session-level user token at a boundary server (such that requests from a client computing device are associated with the session-level user token) or provide the session-level user token directly to requesting client devices. The disclosed systems can utilize version information within the session-level user token to verify that write data within a session is up-to-date and accurate in responding to subsequent requests within the session.

To illustrate, the system can compare a version corresponding to write data of a session-level user token with version information corresponding to digital data accessible via any particular server. If the digital data accessible via the remote server is not at least the version indicated by the session-level user token, the disclosed systems can wait until the local server is updated to mirror other servers across the distributed network. In response to determining that the available copy of the digital data is at least the version indicated by the session-level user token during the session, the disclosed systems provide digital data associated with the request to the client computing device. Thus, the disclosed systems can accurately and efficiently ensure that, during a session, client computing devices will read the writes previously submitted during the session.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
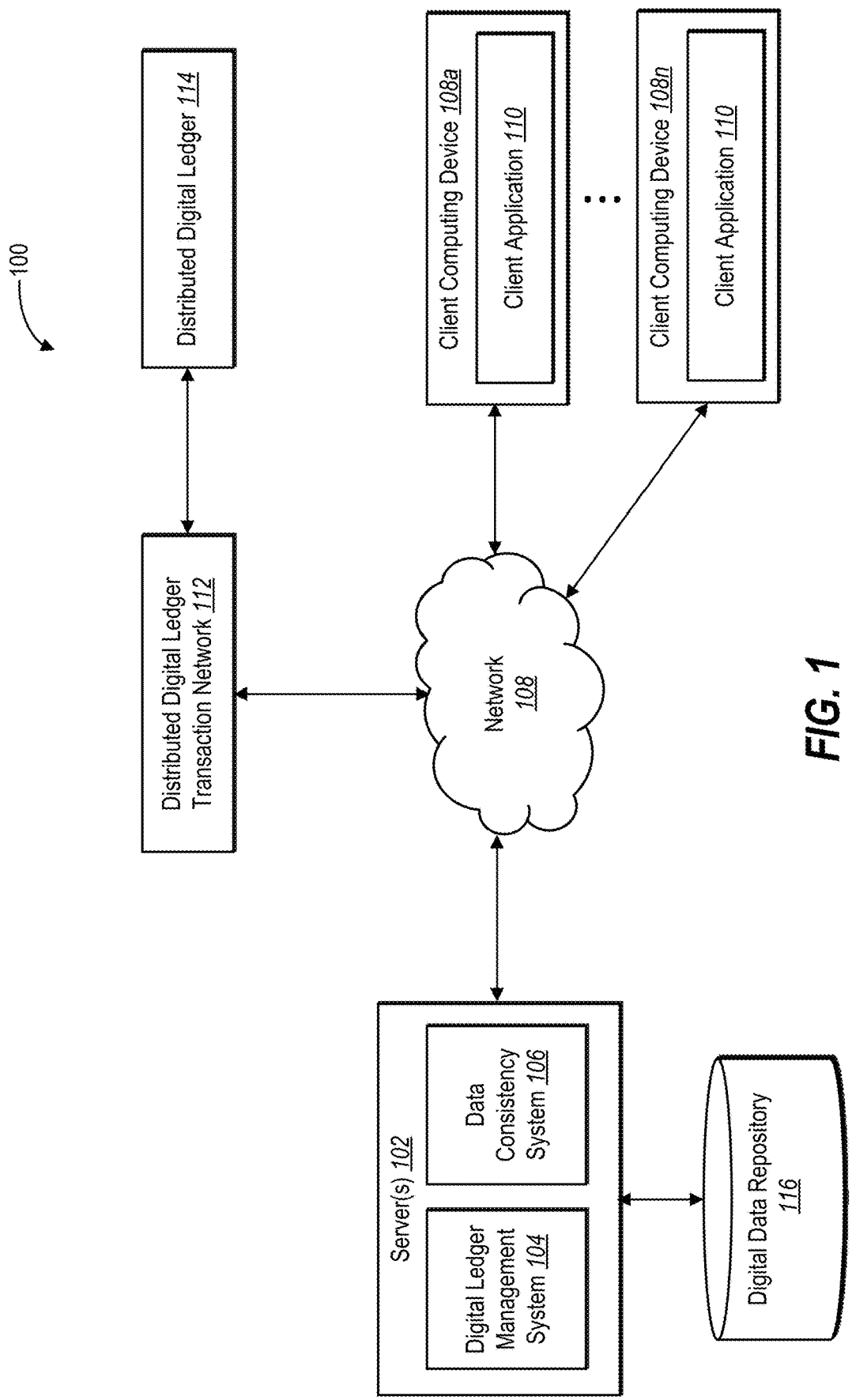
FIG. 1 illustrates a diagram of an environment in which a session-level read-your-writes consistency system can operate in accordance with one or more embodiments.

This disclosure describes one or more embodiments of a session-level read-your-writes consistency system (or "data consistency system") that utilizes session-level user tokens to verify read-data consistency during a session in a distributed computer network. In particular, the data consistency system can establish a session-level data consistency boundary where data provided from the distributed computer network within a session will reflect any write data previously submitted by a requesting device within the session. In one or more embodiments, the data consistency system provides this session-level read-your-writes guarantee by generating and managing a session-level user token.

For example, in response to receiving (at a first server from a client computing device) a write request to create or revise digital data, the data consistency system generates a session-level user token. In one or more embodiments, the data consistency system generates the session-level user token including a write-data version of the modified digital data (e.g., by creating a new token or modifying/merging into an existing token). In at least one embodiment, the data consistency system does not maintain a centralized repository of session-level user tokens (which would inject system inefficiencies in requesting and retrieving the tokens), but rather maintains the session-level user token in connection with either client computing devices or in connection with a boundary system that manages session-level requests.

In one or more embodiments, the data consistency system receives (at a second server) a request from the client computing device that requires access to the modified digital data resulting from the previous write request. Indeed, following a write request, a user of a client computing device has an anticipation for the data modified as a result of the write request to be subsequently provided in connection with a read request. Accordingly, the data consistency system can utilize a session-level user token associated with a session to guarantee that the client computing device reads the writes that were previously initiated in the same session.

For example, the data consistency system can receive the request in connection with the session-level user token associated with the client computing device. The data consistency system further determines whether an available copy of the modified digital data at the second server has a version that matches the write-data version associated with the previously generated session-level user token. If the version of the available modified digital data matches with the write-data version, the data consistency system provides the available modified digital data to the client computing device. If not, the data consistency system waits until the available modified data is updated to mirror an updated version of the modified data in another server across the distributed system. In this manner, the data consistency system can efficiently and accurately guarantee write consistency at a session level for a client device accessing various servers of a distributed computer network.

As just mentioned, in one or more embodiments the data consistency system verifies write consistency through one or more session-level user tokens. For example, in one or more embodiments, the data consistency system generates and maintains a session-level user token in response to receiving a first write request from a client computing device. The data consistency system further updates and maintains the session-level user token as the client computing device initiates additional write requests to modify the same or additional digital data in the same session. For instance, the data consistency system can generate and update the session-level user token to include an indication of modified digital data and the write-data version of the same modified digital data.

In one or more embodiments, the data consistency system utilizes a non-centralized approach to maintaining session-level user tokens. For example, in one or more embodiments, the data consistency system generates session-level user tokens and provides the session-level user token back to the client computing device where the write request originated. In particular, the data consistency system can generate and hold these session-level user tokens in a session store database and provide the session-level user token from the session store to the client computing device. The client computing device then combines the session-level user token with additional requests (e.g., write requests or read requests) within the same session. Accordingly, the data consistency system utilize the client device itself to associate the session-level user tokens with any additional requests for modified digital data.

In one or more embodiments, the data consistency system does not provide the session-level user tokens to client computing devices, but rather manages the session-level user tokens at a system boundary (e.g., at a trust boundary where the data consistency system receives and routes requests). For example, the data consistency system can manage session-level user tokens utilizing a request routing server that serves as a gatekeeper to the distributed network (e.g., at a boundary of the secure environment where the data consistency system resides). In one or more embodiments, the request routing server can access a session store database. For example, in response to receiving a request from a client device, the request routing server can generate a new session-level user token and store the session-level user token in the session store database (for example, when a client computing device submits a first request of a session).

Similarly, in response to receiving a subsequent request, the request routing server can fetch a session-level user token from the session store database. Upon creating or fetching a session-level user token, the request routing server can provide the request and the session-level user token to a secure server to access the requested data. In one or more embodiments, the session store is maintained geographically such that requests from geographic regions hit a particular request routing server and corresponding session store (thus ensuring that the request routing servers will have access to the latest session-level user token for the session).

In one or more embodiments, the data consistency system efficiently manages the size of the session-level user token. For example, a client computing device may initiate many write requests during a single session, which may lead to a data-heavy session-level user token. In at least one embodiment, the data consistency system manages the size of the session-level user token by automatically expiring data from the session-level user token that is older than a threshold period of time. For instance, for each write request indicated by the session-level user token, the data consistency system can determine that an amount of time since receiving the write request satisfies expiration criteria. If the corresponding data pair satisfies the expiration criteria, the data consistency system removes the corresponding data from the session-level user token. The data consistency system can further determine that a data pair satisfies other expiration criteria. For example, the data consistency system can remove data from a session-level user token in response to determining that replication of the data is complete across all replicas (e.g., all data servers are updated for that write data). In one or more embodiments, the data consistency system can also modify granularity of the data blocks applicable to versioning information (thus varying the amount of data needed to store within the session-level user tokens). Thus, the data consistency system ensures the session-level user token includes the most recent and relevant data (e.g., write-data versions, digital data objects) while remaining computationally efficient.

While the data consistency system can function in connection with many types of distributed networks, in at least one embodiment, the data consistency system performs consistency verification within a distributed digital ledger transaction network. For example, the data consistency system may receive a write request from a client computing device that includes a digital asset transaction request for a distributed digital ledger maintained by the distributed digital ledger network. The data consistency system can further transmit the digital asset transaction request to the distributed digital ledger to generate the modified digital data reflecting the modified digital asset.

In response to receiving a request—including the session-level user token in the same session—for the updated distributed digital ledger information reflecting the digital asset modification transaction, the data consistency system can verify that an available copy of the updated distributed digital ledger information includes a version identifier that corresponds with a write-data version in the session-level user token. The data consistency system can further provide the updated distributed digital ledger information associated with the digital asset modification transaction to the client computing device. Alternatively, if the data consistency system determines that the available copy of the updated distributed digital ledger information does not include a version identifier that corresponds with the write-data version in the session-level user token, the data consistency system can wait to provide the updated distributed digital ledger information until the available copy is updated to match the indicated write-data version. Accordingly, the data consistency system ensures that the updated information provided to the client computing device is the correct version.

As mentioned above, the data consistency system provides many technical advantages and benefits over conventional systems. For example, the data consistency system can improve efficiency and latency relative to conventional systems. As mentioned above, some conventional systems wait for all servers to globally include mirrored information before responding to a client device request, which undermines efficiency and response times. In contrast, the data consistency system efficiently analyzes session-level user tokens to verify whether data requested by a client device during the same session has a more recent version. Accordingly, data consistency system can leverage the digital request from the requesting device itself to efficiently verify data accuracy and respond quickly within a session.

Moreover, as mentioned above, the data consistency system can offer significant improvements relative to digital systems that utilize a central status/version server to manage data verification. Indeed, unliked these systems, the data consistency system can avoid the excessive bandwidth and computational expense associated with unnecessary queries for status information and version histories from a central repository. Indeed, by analyzing session-level user tokens that follow the request-response path itself, the data consistency system can analyze requests from client devices and immediately determine whether a particular server has up-to-date write information corresponding to a particular request within a session.

The data consistency system can further improve efficiency by limiting the size and data requirements corresponding to session-level user tokens. As mentioned above, the data consistency system can apply expiration criteria (e.g., time thresholds or replication measurements) to remove any outdated or unnecessary information stored within session-level user tokens. Additionally, the data consistency system can manage session-level user tokens based on different levels of version granularity to reduce the amount of information stored within the session-level user token (e.g., use a version indicator for all of a user's data objects rather than individual data object versions). Accordingly, the data consistency system can generate and manage session-level user tokens that remain computationally efficient across the duration of any given client device session.

Moreover, the data consistency system can improve accuracy relative to conventional systems. For example, in contrast to systems that provide outdated information that does not reflect client device write requests across different servers, the data consistency system can guarantee that write requests from a client device are reflected in subsequent digital data provided to a client device within the same session. Indeed, by analyzing session-level user tokens included with transaction requests to any particular server, the data consistency system can verify that data provided to client devices reflects any write request previously received from the client device within the same session.

Moreover, in one or more embodiments, the data consistency system can flexibly operate to further improve efficiently. In at least one embodiment, if the data consistency system receives a request from a second client computing device for digital data that was modified in response to a write request from a first client computing device (e.g., in a different session), the data consistency system does not perform the consistency verification. Instead, the data consistency system may provide the available version of the modified digital data to the second client computing device—regardless of the version. Accordingly, the data consistency system can selectively and flexibly perform the consistency verification processes to simultaneously maintain fast response speeds when providing modified digital data to non-modifying client computing devices, and avoid inaccuracies and mirroring latency when providing modified digital data to the modifying client computing device.

As illustrated by the foregoing discussion, the present disclosure utilizes a variety of terms to describe features and benefits of the data consistency system. Additional detail is now provided regarding the meaning of these terms. For example, as used herein, the term "write request" refers to a digital communication to revise, delete, or add new digital data in connection with a digital data repository. For example, a write request can originate from a client computing device and can include instructions to modify digital data in a digital data repository. In one embodiment, to illustrate, a write request can include a digital asset transaction request for a distributed digital ledger transaction network to transfer a digital asset from one account to another account reflected by the distributed digital ledger. As used herein, the term "read request" refers to a digital communication to access data or cause data to be accessed in order to generate a response. For example, a read request can originate from the client computing device and include instructions that cause a server to access digital data in a digital data repository and generate a response based on the accessed digital data.

As used herein, the term "session-level user token" refers to a digital file or element that includes an identifier corresponding to a session of a client device. In particular, a session-level user token can include a digital element that includes a session identifier and/or version information associated with digital data modified in connection with a client computing device during a session. For example, a session-level user token can include information indicating one or more digital data objects (e.g., digital assets) modified by a distributed digital ledger transaction network in response to write requests from a client computing device. The session-level user token can further include the write-data version of each digital data object resulting from the modification. For example, if a digital data object was in a 4th version prior to a write data request from the client computing device, the write data consistency system can update the write-data version associated with the digital data object in the session-level user token associated with the client computing device to indicate a 5th version.

As used herein, the term "session" refers to a dedicated period of interaction between two or more computing devices and/or systems. For example, a session can include a period of information exchange between a client computing device and a digital ledger management system. To illustrate, a digital ledger management system may initiate a session with a client computing device in response to receiving a login request or write-data request from the client computing device. In one or more embodiments, the digital ledger management system can provide a session identifier or session identifiers to the client computing device to indicate the active session. The digital ledger management system can deactivate, or otherwise terminate/release the session in response to a log off request from the client computing device, a server-initialized forced-logout, an inactive period of time, or a lost connection with the client device.

As used herein, the term "write-data version" refers to version information associated with digital data (e.g., a version of a digital data object within a session-level user token). Additionally, the term "version identifier" refers to version information associated with digital data within a digital data repository. For example, a digital data repository accessed by a server of the distributed digital ledger management system can include digital data (e.g., digital data objects) and associated version identifiers indicating current versions of the stored digital data.

In one or more embodiments, the data consistency system compares data (e.g., write-data versions and version identifiers) in a variety of ways. As used herein, the term "match" refers to these methods of comparison. For example, the data consistency system can determine that a version identifier matches a write-data version in response to determining that the version identifier is greater than or equal to the write-data version. The data consistency system can also determine that a version identifier matches a write-data version in response to determining that the number indicated by the version identifier is at least the number indicated by the write-data version. In other examples, the data consistency system can determine that a first data object matches a second data object in response to determining that the first data object is a successor or follows the second data object. The data consistency system can determine data matches utilizing string comparison, mathematical operators, machine learning, or any other applicable technique.

Moreover, the term "distributed digital ledger" refers to common data maintained across a plurality of computing devices. In particular, a distributed digital ledger can include one or more common data structures maintained by a plurality of computing devices that reflects states, transactions, events, and/or account data. To illustrate, a distributed digital ledger can include one or more data structures reflecting the state of user accounts associated with the distributed digital ledger, data associated with executed transactions, data corresponding to transaction events, and/or data relating to consensus of the distributed digital ledger. The distributed digital ledger can include, but is not limited to, the following properties: publicly-available (i.e., viewed by anyone), tamper-resistant (i.e., data manipulation is detectable), transparent (i.e., anyone can view the history of the digital, including executed transactions), and replicated (i.e., every computer node has a copy).

Additionally, as used herein, the term "distributed digital ledger transaction network" refers to a network of computing devices for maintaining a distributed digital ledger. In particular, a distributed digital ledger transaction network can include a collection of computing devices, associated peripherals, communication protocols, and communication mediums that can implement and/or interact with a system implementing a distributed digital ledger. For example, a distributed digital ledger transaction network can include one or more client devices and computer nodes communicating via a network to implement and/or interact with a system implementing a distributed digital ledger.

Additional detail regarding the data consistency system will now be provided with reference to the figures. For example, FIG. 1 illustrates a schematic diagram of an exemplary system environment ("environment") 100 in which a data consistency system 106 can be implemented. As illustrated in FIG. 1, the environment 100 includes a server(s) 102, a network 108, client computing devices 108*a*-108*n*, a distributed digital ledger transaction network 112, a distributed digital ledger 114, and a digital data repository 116.

Although the environment 100 of FIG. 1 is depicted as having a particular number of components, the environment 100 can have any number of additional or alternative components (e.g., any number of servers, client computing devices, distributed digital ledger transaction networks, distributed digital ledgers, or digital data repositories in communication with the data consistency system 106 either directly or via the network 108). Similarly, although FIG. 1 illustrates a particular arrangement of the server(s) 102, the network 108, the client computing devices 108a-108n, the distributed digital ledger transaction network 112, the distributed digital ledger 114, and the digital data repository 116, various additional arrangements are possible.

The server(s) 102, the network 108, the client computing devices 108a-108n, the distributed digital ledger transaction network 112, the distributed digital ledger 114, and the digital data repository 116 may be communicatively coupled with each other either directly or indirectly (e.g., through the network 108 discussed in greater detail below in relation to FIG. 8). Moreover, the server(s) 102, the client computing devices 108a-108n, and the distributed digital ledger transaction network 112 may include a variety of computing devices (including one or more computing devices as discussed in greater detail with relation to FIG. 7).

As mentioned above, the environment 100 includes the server(s) 102. In one or more embodiments, the server(s) 102 generate, store, receive, and/or transmit digital data, including digital data related to write requests to be implemented via the distributed digital ledger transaction network 112. To provide an illustration, the server(s) can generate (or receive) a write request and initiate the corresponding transaction by submitting the write request to the distributed digital ledger transaction network 112. In one or more embodiments, the server(s) 102 comprises a data server. In some embodiments, the server(s) 102 comprises a communication server or a web-hosting server.

As shown in FIG. 1, the server(s) 102 includes the digital ledger management system 104. In one or more embodiments, the digital ledger management system 104 communicates and/or otherwise engages with the distributed digital ledger transaction network 112. For example, the digital ledger management system 104 operates as a digital wallet to store the cryptographic keys of an account address and access the cryptographic keys to perform various tasks, such as to sign a transaction request for submission to the distributed digital ledger transaction network 112. In some implementations, the digital ledger management system 104 stores the cryptographic keys of an account address locally (e.g., within the server(s) 102). In some cases, the digital ledger management system 104 stores the cryptographic keys of an account address in external storage (e.g., the digital data repository 116, the client computing devices 108a-108n, and/or one or more computing devices of the distributed digital ledger transaction network 112). For example, in one or more implementations, the distributed digital ledger transaction network 112 includes the network described in SCALABLE, SECURE, EFFICIENT, AND ADAPTABLE DISTRIBUTED DIGITAL LEDGER TRANSACTION NETWORK, application Ser. No. 16/442,470, filed Jun. 15, 2019, which is hereby incorporated by reference herein in its entirety.

Additionally, the server(s) 102 include the data consistency system 106. In particular, in one or more embodiments, the data consistency system 106 performs consistency verification in connection with modified digital data of the distributed digital ledger 114. For example, the data consistency system 106 can utilize the server(s) 102 to compare a write-data version for digital data (e.g., a digital object) against a version identifier associated with an available copy of the digital data via the digital ledger management system 104. In one or more embodiments, the data consistency system 106 can store session-level user token logs and other request information (e.g., associated with write requests and read requests) in the digital data repository 116.

In one or more embodiments, the distributed digital ledger transaction network 112 includes a plurality of computing devices that maintain the distributed digital ledger 114. For example, the distributed digital ledger transaction network 112 can receive (e.g., via one of its node computing devices) a transaction request, such as a digital asset transaction request to transfer a digital asset to another account address of the distributed digital ledger 113. In response to receiving the transaction request, the distributed digital ledger transaction network 112 can operate to execute and commit the corresponding transaction to the distributed digital ledger 114 using a consensus protocol.

In one or more embodiments, the client computing devices 108a-108n include computing devices that are capable of interacting with the data consistency system 106, such as by submitting transaction requests (e.g., read request, write requests) or instructions to generate transaction requests. For example, in some implementations, the client computing devices 108a-108n include at least one of a smartphone, a tablet, a desktop computer, a laptop computer, a head-mounted-display device, or other electronic device. Further, in some cases, each of the client computing devices 108a-108n is associated with one or more user accounts of the distributed digital ledger transaction network 112 (e.g., associated with one or more account addresses of the distributed digital ledger). In some instances, the client computing devices 108a-108n include one or more applications (e.g., the client application 110) that are capable of interacting with the data consistency system 106, such as by submitting transaction requests or instructions to generate transaction requests. For example, in some embodiments, the client application 110 includes a software application installed on the client computing devices 108a-108n. In other cases, however, the client application 110 includes a web browser or other application that accesses a software application hosted on the server(s) 102.

The data consistency system 106 can be implemented in whole, or in part, by the individual elements of the environment 100. Indeed, although FIG. 1 illustrates the data consistency system 106 implemented with regard to the server(s) 102, different components of the data consistency system 106 can be implemented by a variety of devices within the environment 100. For example, one or more (or all) components of the data consistency system 106 can be implemented by a different computing device (e.g., one of the client computing devices 108a-108n) or a separate server from the server(s) 102 hosting the digital ledger management system 104. Example components of the data consistency system 106 will be described below with regard to FIG. 5.

Figure 2A:
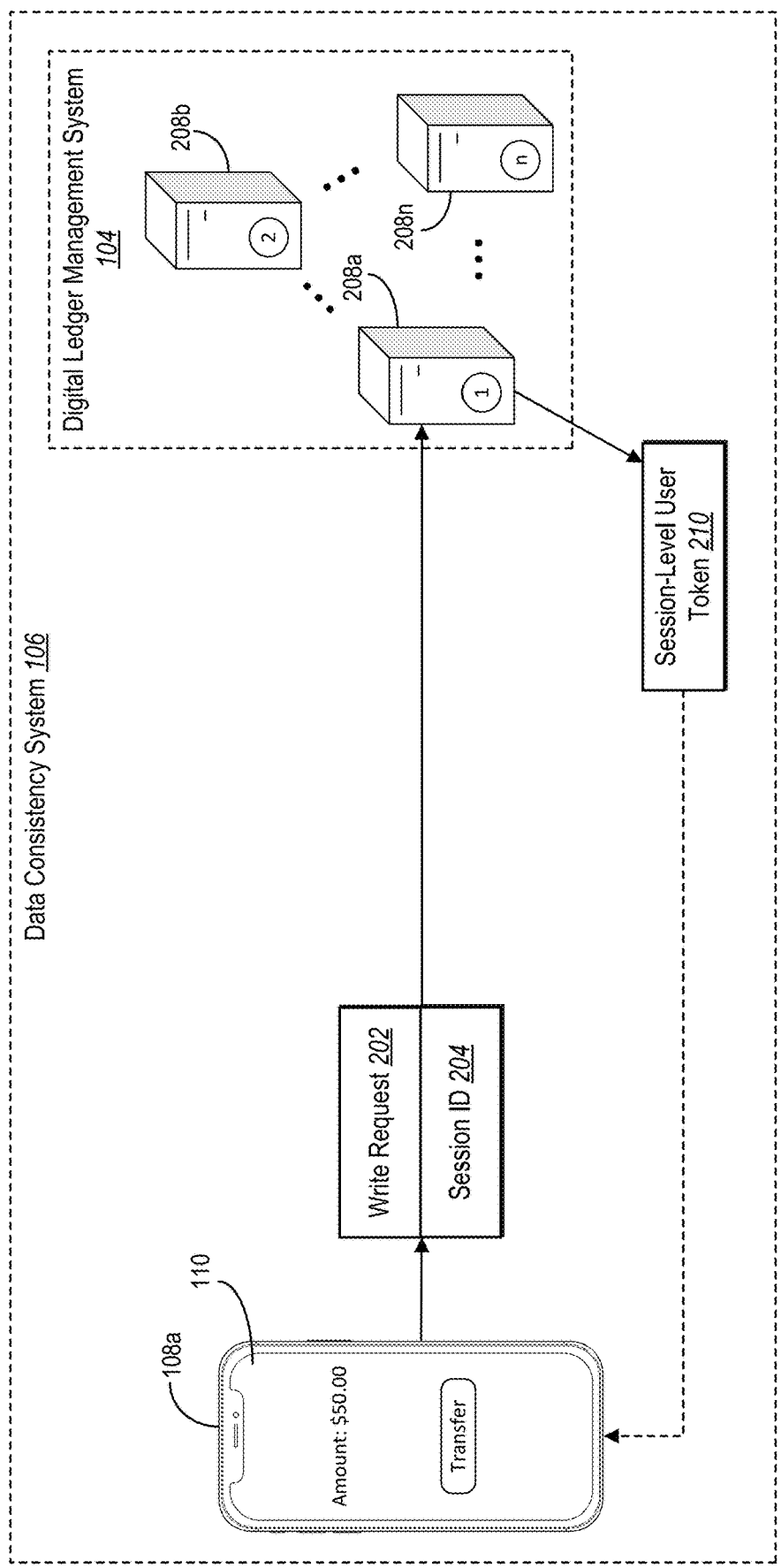
FIG. 2A illustrates a diagram of generating a session-level user token in response to receiving a write request associated with modify digital data in accordance with one or more embodiments.
Figure 2B:
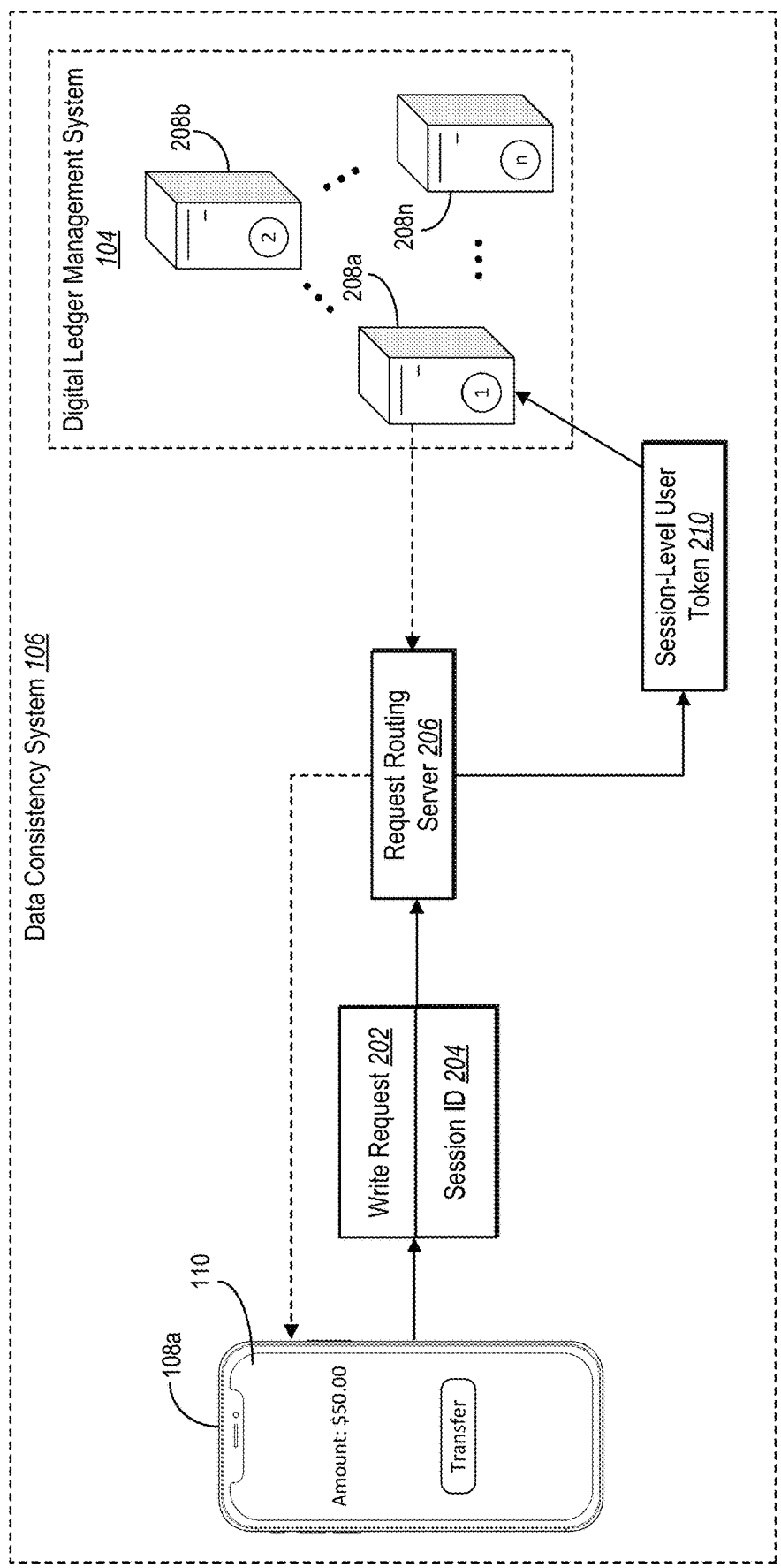
FIG. 2B illustrates a diagram of generating a session-level user token at an intermediate request routing server in response to receiving a write request associated with modified digital data in accordance with one or more embodiments.

As mentioned above, the data consistency system 106 generates session-level user tokens in different ways. In some embodiments, the data consistency system 106 provides the session-level user token to the client computing device. In some embodiments, the data consistency system 106 manages the session-level user token at a system boundary utilizing a request routing server. For example, FIG. 2A illustrates the data consistency system 106 generating a session-level user token and providing the session-level user token to the client computing device 108a for further use in the current session. Additionally FIG. 2B illustrates the data consistency system 106 generating a session-level user token at a request routing server at the boundary of the digital ledger management system 104, and maintaining the session-level user token along the data path of the write request within the digital ledger management system 104.

In more detail, FIG. 2A illustrates the data consistency system 106 generating a session-level user token in response to receiving a write request to modify digital data at one or more servers of the digital ledger management system 104. For example, as shown in FIG. 2A, the client computing device 108a initiates a write request 202. In one or more embodiments, the write request 202 can include instructions requesting new digital data be written to one or more digital data repositories. Additionally or alternatively, the write request 202 can include instructions requesting modification of existing data in one or more digital data repositories. More specifically, the client application 110 (e.g., a digital wallet) detects one or more user interactions with a display of the client application 110 via the client computing device 108a. For instance, the client application 110 can detect one or more user interactions that configure a digital asset transaction request that causes the distributed digital ledger transaction network 112 to modify digital data in the distributed digital ledger 114.

The client computing device 108a can generate and send the write request 202 based on the detected user interactions. For example, the client application 110 installed on the client computing device 108a can generate the write request 202 including information associated with the client application 110 (e.g., account information, cryptographic keys, user information), and the digital asset transaction request (e.g., a instructions to generate or modify digital data). Additionally, in one or more embodiments, the client computing device 108a generates the write request 202 and combines the write request 202 with a session identifier 204 associated with the currently active session between the client application 110 and the digital ledger management system 104. For example, the digital ledger management system 104 may have already provided the client computing device 108a with the session identifier 204 in response to a login request. In at least one embodiment, the session identifier 204 is unique to the particular session that is currently active between the client application 110 and the digital ledger management system 104. For example, the client application 110 and the digital ledger management system 104 attach the session identifier 204 to electronic communications to ensure that transaction requests and responses are correctly routed and handled. In one or more embodiments, the session identifier 204 can include a seed value that is incremented or otherwise modified for every new transaction (e.g., write request, read request) during the session.

In response to the digital ledger management system 104 receiving the write request 202 at the server 208a (or any other server in the digital ledger management system 104), the data consistency system 106 can generate a session-level user token 210. For example, the data consistency system 106 can generate the session-level user token 210 based on the information associated with the write request 202. To illustrate, the data consistency system 106 can generate the session-level user token 210 with a digital object representing the digital data referenced by the write request 202 and a write data version for the digital object. For instance, when initially generating the session-level user token 210, the data consistency system 106 can determine that the write data version of the digital object is an initial write data version (e.g., zero or one). In another example, the data consistency system 106 can generate the session-level user token 210 by identifying a current version of the digital data referenced by the write request 202 and increment the identified version by one.

In at least one embodiment, the data consistency system 106 generates the session-level user token 210 based on the session identifier 204 included in the write request 202. For example, in order to leverage existing uses of the session identifier 204, the data consistency system 106 can generate the session-level user token 210 by appending or otherwise adding token information to the session identifier 204. To illustrate, the data consistency system 106 can add encoded information to the session identifier 204 that indicates the write-data version associated with the digital data modified by the write request 202. In some embodiments, the data consistency system 106 can increment the session identifier 204 to indicate the write-data version.

In additional or alternative embodiments, rather than generating the session-level user token 210, the data consistency system 106 can identify the session identifier 204 as the session-level user token 210. For example, in response to receiving the write request 202, the data consistency system 106 can leverage the existing session identifier 204 as the session-level user token 210. To illustrate, the data consistency system 106 can leverage the session identifier 204 as the session-level user token 210 by incrementing the session identifier 204 by an amount that indicates or otherwise encodes session-level user token information each time a new transaction (e.g., write request, read request) is initiated between the client computing device 108a and the digital ledger management system 104.

In one or more embodiments, the data consistency system 106 does not maintain the session-level user token 210 within the digital ledger management system 104. Instead, the data consistency system 106 can maintain the session-level user token 210 in association with requests or communication with the client computing device 108a. For example, the data consistency system 106 can provide the generated session-level user token 210 to the client computing device 108a via the client application 110. For instance, the client application 110 on the client computing device 108a can receive the session-level user token 210 from the digital ledger management system 104 either directly via the server 208a or via a request routing server. In one or more embodiments, the client application 110 can maintain the session-level user token 210 for the duration of the current session. The client application 110 can expire (e.g., deactivate, delete, erase) the session-level user token 210 in response to determining that the current session has ended. Additionally or alternatively, the client application 110 can expire the session-level user token 210 by indicating that the session has expired in a data object that represents the session and is stored in a session data store.

FIG. 2B illustrates the data consistency system 106 generating a session-level user token in response to receiving a write request to modify digital data at a request routing server. For example, in one or more embodiments, a request routing server 206 receives the write request 202 from the client computing device 108a. In at least one embodiment, for example, the request routing server 206 resides at the boundary (e.g., a security, privilege, or trust boundary) of the digital ledger management system 104 and handles request routing between the distributed digital ledger management system 104 and client computing devices. For example, in response to receiving the write request 202 from the client computing device 108a, the request routing server 206 can determine a server of the digital ledger management system 104 to receive the write request 202. To illustrate, the request routing server 206 can determine to route the write request 202 to the server 208a of the digital ledger management system 104.

The request routing server 206 can determine to route the write request 202 to the server 208a based on a physical location of the server 208a. For example, both of the client computing device 108a and the server 208a may be physically located within the same city, region, country, etc. Thus, the request routing server 206 determines to route the write request 202 to the server 208a under a speed-based heuristic. Additionally or alternatively, the request routing server 206 can determine to route the write request 202 to the server 208a based on user preferences and/or use history associated with an account indicated by the session identifier 204. For example, the user preferences and/or use history for the account associated with the session identifier 204 may indicate that most write requests from the client computing device 108a are routed to servers based in North America. Additionally or alternatively, the request routing server 206 can determine to route the write request 202 to the server 208a based on a write request type. For example, in response to determining that the write request 202 includes a digital asset transaction request, the request routing server 206 can determine that the server 208a handles this type of write request and route the write request 202 to the server 208a based on this determination. In some embodiments, the request routing server 206 routes the write request 202 to the server 208a based on available computing resources (e.g., the server 208a has bandwidth or processing power available relative to other servers).

In addition to determining to route the write request 202 to the server 208a, the request routing server 206 can also generate and/or fetch the session-level user token 210. For example, as discussed above, the data consistency system 106 can generate the session-level user token 210 at the request routing server 206 based on information associated with the write request 202 and/or the session identifier 204. Additionally or alternatively, the data consistency system 106 can fetch, identify, or lookup the session-level user token 210 from a data repository (e.g., session store) associated with the request routing server 206.

The request routing server 206 can also modify the session-level user token 210 (e.g., in response to determining that the write data has been stored at the server 208a). For example, in response to determining write information from the server 208, the request routing server 206 can determine an updated version identifier and incorporate the updated version identifier with the session-level user token 210. The data consistency system 106 can then store the updated session-level user token 210 in the session store of the request routing server 206. In at least one embodiment, the data consistency system 106 further generates and provides a response to the client computing device 108a indicating that additional requests during the current session should be directed to the request routing server 206. Accordingly, for subsequent requests, the client computing device 108a will transmit the request to the request routing server 206 and the request routing server 206 can fetch and utilize the updated session-level user token 210 (as described in greater detail below with regard to FIG. 3).

Figure 3:
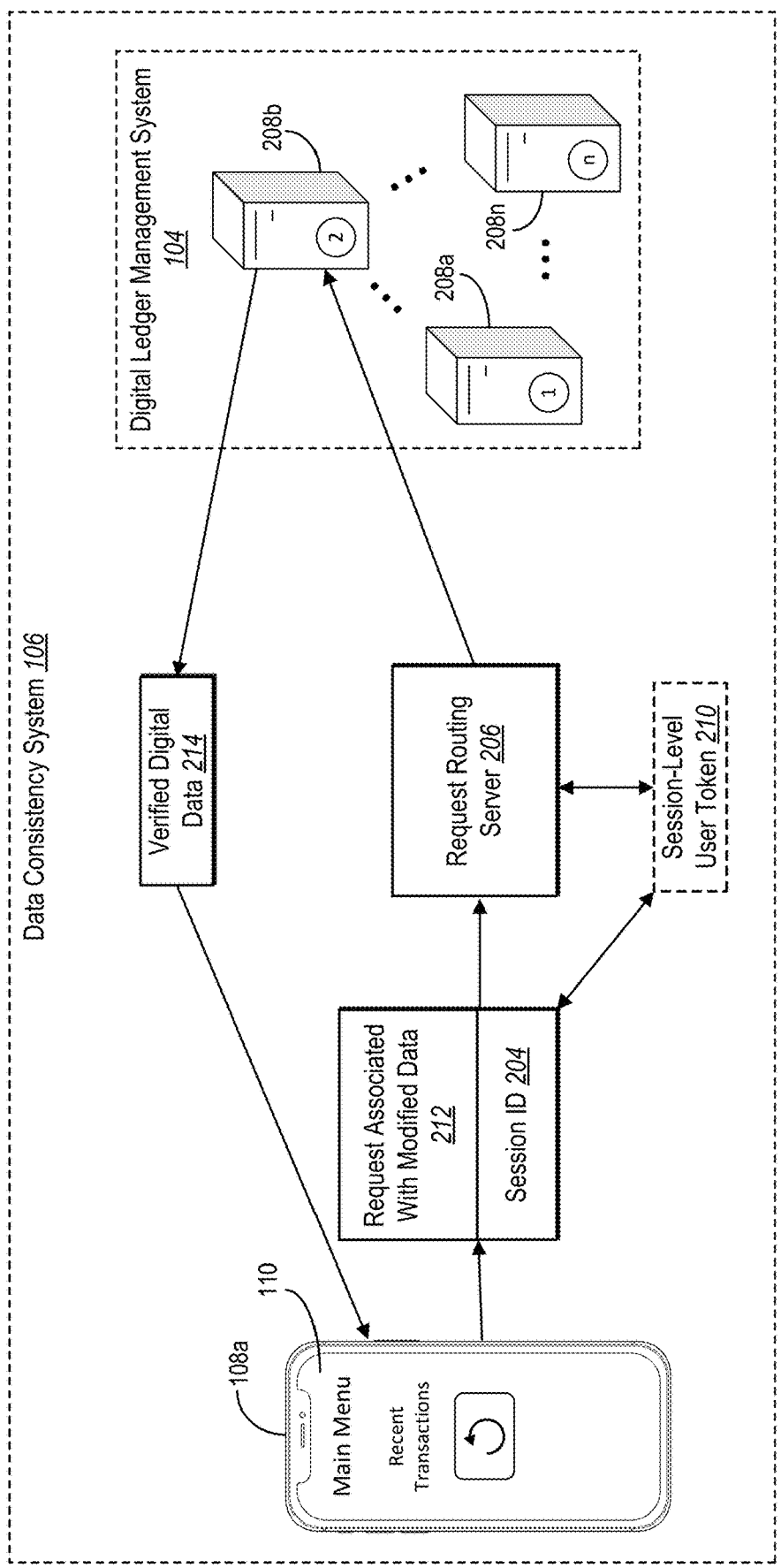
FIG. 3 illustrates a diagram of a consistency verification in connection with a request associated with modified data in accordance with one or more embodiments.

Indeed, as mentioned above, the data consistency system 106 can utilize session-level user tokens in responding to subsequent requests from a client device to verify write consistency. FIG. 3 illustrates the data consistency system 106 utilizing the session-level user token 210 to perform a consistency verification in connection with a request associated with modified data. For example, the client computing device 108a may initiate requests associated with modified data (e.g., digital data managed by the digital ledger management system 104 that was modified in response to the write request 202 from the client computing device 108a) and additional requests in the same session.

To illustrate, at some point in the same session after initiating the write request 202 discussed above with regard to FIG. 2, the client application 110 may initiate a request associated with modified data 212 that resulted from the previous write request 202. For instance, in one embodiment, the write request 202 may be a digital asset transaction request that causes a digital asset associated with the client computing device 108a to be transferred to another account (e.g., a digital payment to another user)—thereby updating and/or modifying the distributed digital ledger 114 maintained by the distributed digital ledger transaction network 112. Thus, as the user of the client computing device 108a navigates back to a main display of the client application 110, the client application 110 may initiate the request associated with modified data 212 to display a transaction list that reflects the completed digital asset transaction request. Accordingly, to avoid providing out-of-date or inaccurate data to the client computing device 108a, the data consistency system 106 utilizes the session-level user token 210 to verify that digital data provided to the client computing device 108a is the correct version (e.g., a version of the distributed digital ledger 114 reflecting the completed transaction) such as a version that matches the write-data version indicated by the session-level user token 210.

This is significant because the subsequent request from the client computing device 108a for modified data 212 may be routed to a different server. Indeed, the servers 208a-208n can be distributed across the globe, and various requests within the same session may be directed to different servers (which may or may not have the same information). The data consistency system 106 can ensure that even if a second server receives a subsequent request from the client computing device 108a, the second server will respond with accurate information that reflects recent write-requests from the client device 108a. In particular, the data consistency system 106 can utilize the session-level user token 210 to verify that information accessible at the second server reflects previous write data from the client computing device 108a and/or another client device in the same session.

In one or more embodiments, as mentioned above, the data consistency system 106 maintains the previously generated session-level user token 210 at the client computing device 108a. For example, the client application 110 can generate the request for modified data 212 including information associated with the modified data being requested and the session-level user token 210. In some embodiments, the client application 110 can further generate the request for modified data 212 including the session identifier 204. Additionally or alternatively, the client application 110 can combine the session-level user token 210 with the session identifier 204 by adding information to the session identifier 204 that reflects the digital data and write-data versions included in the session-level user token 210.

In additional or alternatively embodiments, as mentioned above, the data consistency system 106 maintains the previously generated session-level user token 210 in connection with the request routing server 206. For example, in response to receiving the request for modified data 212 including the session identifier 204, the request routing server 206 can identify within an associated data repository (e.g., a session store) and/or within a distributed network of associated servers. The request routing server 206 can further combine the session-level user token 210 with the request for modified data 212. To illustrate, the request routing server 206 may identify the session-level user token 210 based on the session identifier 204.

Regardless of whether the request routing server 206 receives the session-level user token 210 from the client computing device 108*a* or identifies the session-level user token 210 based on the session identifier 204, the request routing server 206 can provide the request for modified data 212 and the session-level user token 210 to a server of the digital ledger management system 104. In one or more embodiments, the request routing server 206 may provide the request for modified data 212 to a different server than the server previously provided with the write request 202. For instance, as discussed above, the request routing server 206 may provide different types of requests to different servers within the digital ledger management system 104. Accordingly, as shown in FIG. 3, the request routing server 206 may provide the request for modified data 212 to the server 208*b* of the digital ledger management system 104.

As discussed above, in one or more embodiments, the contents of digital data repositories associated with each of the servers 208*a*-208*n* are mirrored across the digital ledger management system 104. For example, one of the servers 208*a*-208*n* may receive a request to add data, delete data, and/or update data. The digital ledger management system 104 can then mirror that addition, deletion, and/or update across the remaining servers. Thus, due to the latencies inherent in mirrored storage systems, the version of digital data residing in a digital data repository associated with the server 208*b* may be different than a version of the same digital data residing in a digital data repository associated with the server 208*a*.

To ensure that a correct version of digital data is provided in response to the digital ledger management system 104 receiving the request for modified data 212 at the server 208*b*, the data consistency system 106 verifies that a version identifier indicated by the server 208*b* corresponds to (e.g., matches) the write-data version of the session-level user token 210. For example, the data consistency system 106 can determine, from the session-level user token 210, a write-data version for the digital data indicated by the request for modified data 212. The data consistency system 106 can then determine, at the server 208*b* a version identifier associated with the locally stored copy of the digital data indicated by the request for modified data 212. The data consistency system 106 then compares the write-data version from the session-level user token 210 and the version identifier determined at the server 208*b*.

In response to determining that the write-data version and the version identifier correspond, the data consistency system 106 can verify that the copy of the digital data on the server 208*b* reflects one or more write-requests and corresponding modified data values previously provided by the client computing device 108*a*. The data consistency system 106 can further cause the server 208*b* to provide the verified digital data 214 to the client computing device 108*a* for use by the client application 110.

In response to determining that the write-data version and the version identifier do not correspond, the data consistency system 106 can determine that the digital data stored by the server 208*b* does not reflect a previous write-request (and modified data values) from the client computing device 108*a*. Thus, the data consistency system 106 can further update the server 208*b* (e.g., wait for the versions of digital data across other servers of the digital ledger management system 104 to be mirrored to the server 208*b*). The data consistency system 106 can perform this consistency verification in connection with any updated data received by the server 208*b* until determining that the digital data accessible via the server includes the modified data requested by the client computing device 108*a*. For example, the data consistency system 106 can provide the verified digital data 214 in response to performing a second consistency verification in connection with the request for modified data 212 and determining that the write-data version indicated by the session-level user token 210 corresponds with the updated version identifier for the updated digital data on the server 208*b*.

Moreover, in additional or alternative embodiments, the data consistency system 106 can utilize the session-level user token 210 among the servers 208*a*-208*n* of the digital ledger management system 104. For example, one or more embodiments, the server 208*b* may receive the request associated with the modified data 212 together with the session-level user token 210. In turn, the server 208*b* can call the server 208*n* to generate a response to the request associated with the modified data 212. Thus, the data consistency system 106 can cause the server 208*b* to transmit or otherwise communicate the session-level user token 210 to the server 208*n*. The data consistency system 106 can cause the server 208*n* to update the session-level user token 210 with updated data information (e.g., write data previously provided to the server 208*n*). The server 208*n* can then provide the write data together with the updated session-level user token 210 to the server 208*b*. Accordingly multiple servers within the digital ledger management system 104 can utilize the session-level user token 210 to verify accurate versioning information associated with the request 212 while the data consistency system 106 causes the session-level user token 210 to travel along the data path through the digital ledger management system 104.

In one or more embodiments, the data consistency system 106 can perform the acts described above with reference to FIGS. 2A, 2B, and 3 in connection with additional requests during the same session. For example, the client computing device 108*a* can initiate a second write request to modify the same digital data (e.g., initiate a second digital asset transaction request to transfer a digital asset within the distributed digital ledger transaction network 112). Accordingly, the data consistency system 106 can generate an updated session-level user token associated with the client computing device 108*a* to include an updated the write-data version for the digital data. The data consistency system 106 can further perform an additional consistency verification in connection with the updated write-data version. Thus, regardless of how many times the client computing device 108*a* modifies and requests digital data and how many versions that digital data reside within the digital ledger management system 104, the data consistency system 106 ensures that the version of the digital data that is provided to the client computing device 108*a* corresponds with the write-data version indicated by the session-level user token 210 associated with the client computing device 108*a*.

Although FIG. 3 illustrates the data consistency system 106 operating with the request routing server 206, it will be appreciated that the request routing server 206 is not necessary in managing the session-level user tokens. Indeed, the data consistency system 106 can operate using a distributed architecture shown in FIG. 2A that does not include the request routing server 206 in managing the session-level user tokens. Specifically, the client computing device 108*a* can provide the session-level user token 210 with the request associated with modified data 212 and the servers 208*a*-208*n* can then utilize the session-level user token 210 to verify data accuracy and generate a response, as described above.

Figure 4A:
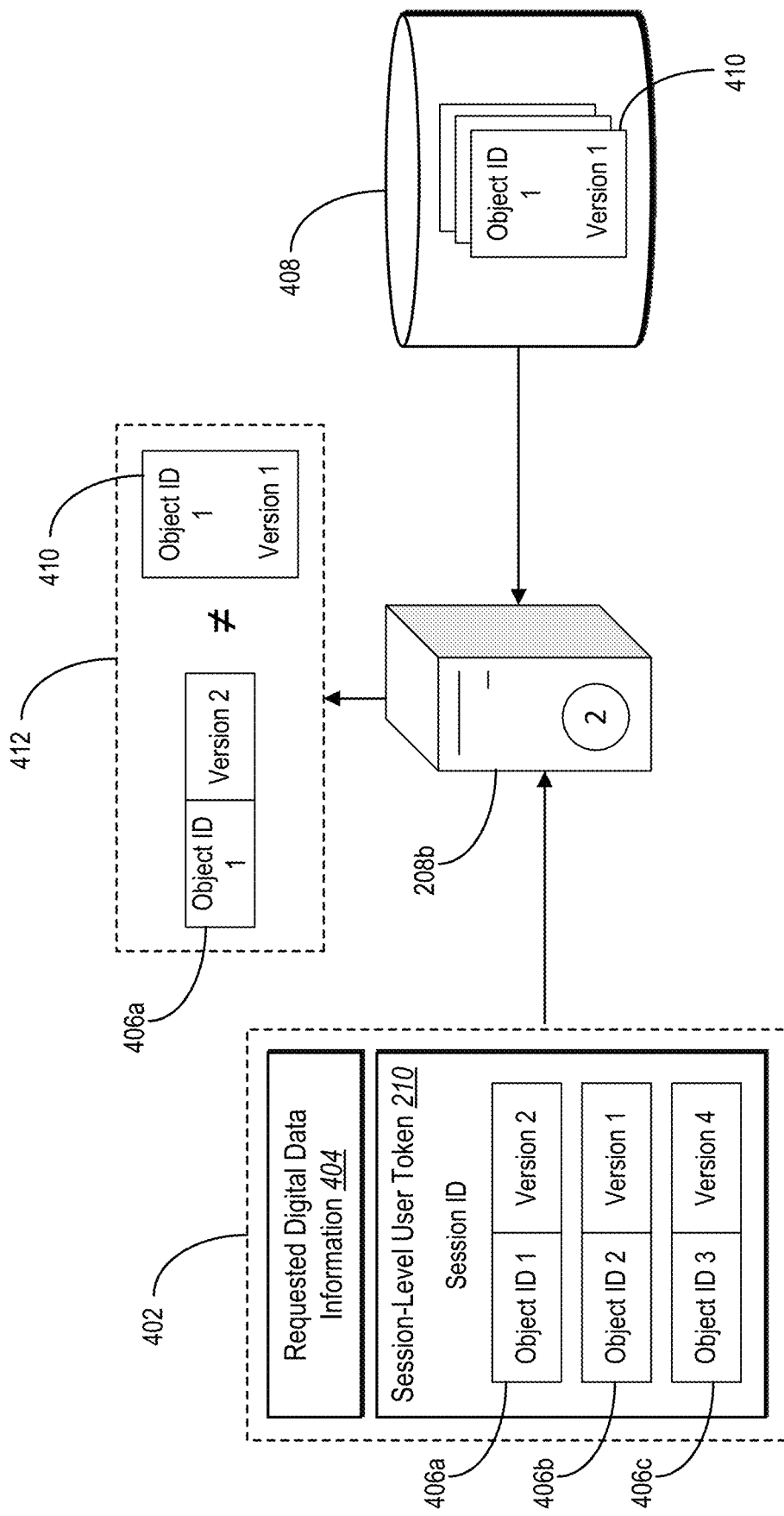
FIGS. 4A and 4B illustrate diagrams of the consistency verification in connection with a session-level user token in accordance with one or more embodiments.
Figure 4B:
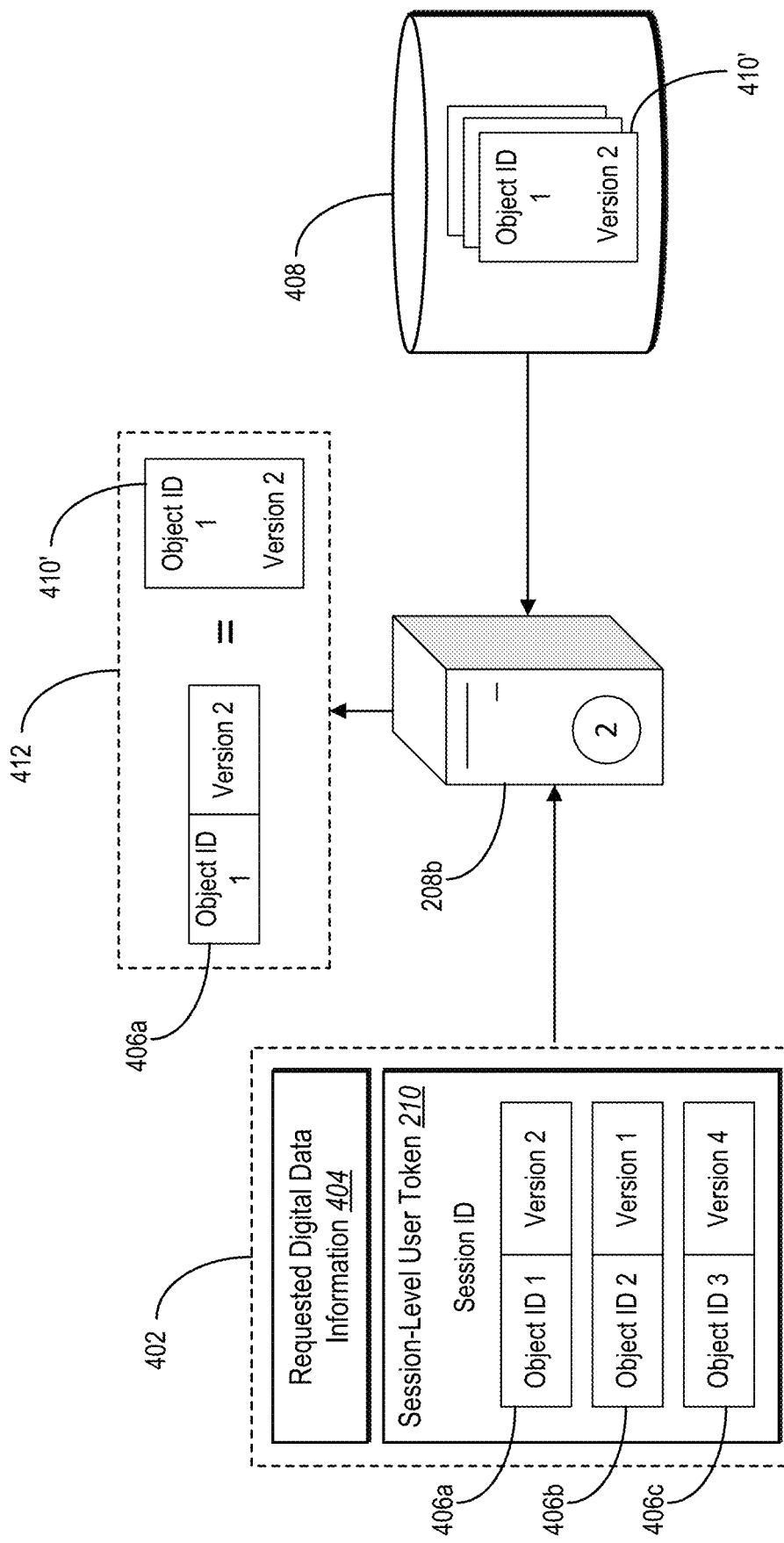

FIGS. 4A and 4B illustrate the data consistency system 106 performing consistency verification in connection with the session-level user token 210. For example, as shown in FIG. 4A, the data consistency system 106 can perform consistency verification in response to a request 402 (e.g., a request for modified data) including requested digital data information 404 and the session-level user token 210. In one or more embodiments, the requested digital data information 404 can include an indicator or identifier associated with the requested modified digital data, and/or other information associated with the modified digital data.

As further shown in FIG. 4A, the session-level user token 210 can include data pairs 406*a*, 406*b*, 406*c* indicating digital data (e.g., data objects indicated by object identifiers) that have been modified during the current session. For example, the data pairs 406*a*-406*c* indicate that during in current session, one or more modifications have been made to data object ID 1, data object ID 2, and data object ID 3. The data pairs 406*a*-406*c* further indicate the write-data versions that have resulted from these modifications. It should be noted that the data pairs 406*a*-406*c* are session-specific, rather than device specific. Therefore, the data objects indicated by the data pairs 406*a*-406*c* may have been modified in response to requests from the client computing device 108*a* and/or other client computing devices that operate within the same session.

In response to the server 208*b* receiving the request 402, the data consistency system 106 can identify the digital data 410 corresponding to the requested digital data information 404. For example, the data consistency system 106 can identify the digital data 410 including the corresponding copy of the digital object and a version identifier for the digital object. In one or more embodiments, the data consistency system 106 identifies the digital data 410 within a digital data repository 408 associated with the server 208*b*.

As mentioned above, the data consistency system 106 can modify the granularity of data corresponding to version information. For example, the data consistency system 106 can track version information for individual data objects (e.g., a particular entry, such as a ledger transaction amount) or different groups of data objects (e.g., all ledger transactions or all any data associated with a particular user account). Indeed, by modifying the granularity of this versioning information, the data consistency system 106 can also adjust or control the size of the session-level user token. Accordingly, while FIG. 4A shows the data consistency system 106 identifying the digital data 410, in additional or alternative embodiments, the data consistency system 106 can identify a group of digital data objects associated with, or containing, the requested digital data information 404. Thus, the version identifier associated with the group of digital data objects can indicate a shared version for each of the digital data objects in the group.

The data consistency system 106 further performs the consistency verification by performing the determination 412 of whether the data pair 406*a* corresponding to the requested digital data information 404 corresponds with the digital data 410. For example, the data consistency system 106 can make the determination 412 by analyzing whether the write data version indicated by the data pair 406*a* (e.g., "version 2") corresponds with the version identifier within the digital data 410 (e.g., "version 1"). To illustrate, the data consistency system 106 can determine whether the version identifier matches the write data version utilizing string comparison, mathematical operators, machine learning models, or any other method of comparison. As shown in FIG. 4A, the data consistency system 106 can determine that the write data version does not correspond with the version identifier.

As discussed above, in response to determining that the write data version does not correspond with the version identifier (e.g., the version identifier is less than the write data version), the data consistency system 106 can update the digital data repository 408 or wait for the digital data repository 408 to be updated, and perform the consistency verification again. For example, as shown in FIG. 4B, the data consistency system 106 can perform the determination 412 again to determine whether the write-data version indicated by the data pair 406*a* corresponds with the version identifier within the updated digital data 410'. In response to determining that the write-data version corresponds with (e.g., matches) the version identifier, the data consistency system 106 can provide the updated digital data 410' and/or otherwise utilize the updated digital data 410' to generate a response for the client computing device 108*a*.

Figure 5:
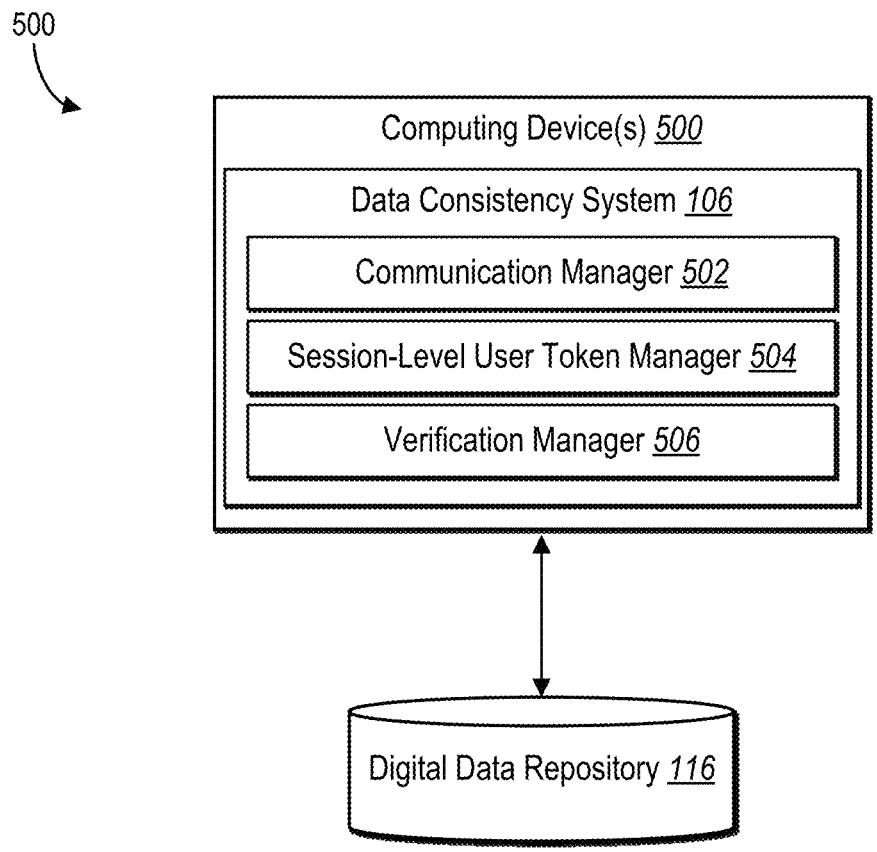
FIG. 5 illustrates a detailed schematic diagram of the session-level read-your-writes consistency system operating on a computing device in accordance with one or more embodiments.

Turning now to FIG. 5, additional detail will be provided regarding various components and capabilities of the data consistency system 106. In particular, FIG. 5 illustrates the data consistency system 106 implemented by a computing device 500 (e.g., the server(s) 102 and/or one of the client computing devices 108*a*-108*n* discussed above with reference to FIG. 1). As shown, the data consistency system 106 can include, but is not limited to, a communication manager 502, a session-level user token manager 504, and a consistency verification manager 506.

As just mentioned, and as illustrated, in FIG. 5, the data consistency system 106 may include the communication manager 502. In one or more embodiments, the communication manager 502 handles data consistency communications tasks among the client computing devices 108*a*-108*n*, the request routing server 206, the digital ledger management system 104, and the distributed digital ledger transaction network 112. For example, the communication manager 502 formats and sends requests (e.g., write requests, requests for modified digital data) from the client computing device 108*a* (e.g., via the client application 110, via a web browser). The communication manager 502 further receives requests at the digital ledger management system 104 and/or the request routing server 206.

As mentioned above, and as illustrated in FIG. 5, the data consistency system 106 includes the session-level user token manager 504. In one or more embodiments, the session-level user token manager 504 generates, maintains, and otherwise manages session-level user tokens within the data consistency system 106. For example, the session-level user token manager 504 generates session-level user tokens in response to the data consistency system 106 receiving a write request. In at least one embodiment, the session-level user token manager 504 generates a session-level user token based on a session identifier associated with a current session between a client computing device and the digital ledger management system 104.

The session-level user token manager 504 also maintains a generated session-level user token. For example, the session-level user token manager 504 can maintain a session-level user token at one or more non-centralized locations. To illustrate, the session-level user token manager 504 can send a generated session-level user token to a client computing device where a corresponding write request originated. In one embodiment, the session-level user token manager 504 can maintain the generated session-level user token at the client computing device. In additional or alternative embodiments, the session-level user token manager 504 can maintain the generated session-level user token at the request routing server 206. For example, the session-level user token manager 504 can store the session-level user token at the request routing server 206 such that the request routing server 206 can identify the session-level user token based on a session identifier associated with the client computing device.

The session-level user token manager 504 also manages session-level user tokens. For example, the session-level user token manager 504 manages session-level user token size such that session-level user tokens maintain manageable storage sizes and relevant session information. In one or more embodiments, the session-level user token manager 504 manages a session-level user token by expiring token information that is older than a threshold amount of time. To illustrate, the session-level user token manager 504 can automatically expire a data pair including a digital object and a corresponding write-data version in a session-level user token when a timestamp associated with the data pair indicates that an elapsed amount of time since the data pair was added to the session-level user token satisfies expiration criteria. In at least one embodiment, the session-level user token manager 504 can determine the threshold amount of time by regularly logging update information across servers of the digital ledger management system 104 to identify a minimum amount of time between server updates. In another embodiment, the session-level user token manager 504 can determine the threshold amount of time based on offline correlation between the digital ledger management system 104 and the data consistency system 106.

In one or more embodiments, for example, the session-level user token manager 504 can determine that the elapsed amount of time satisfies expiration criteria if the timestamp is thirty seconds old, two minutes old, etc. For instance, expiration criteria can include a general amount of elapsed time, a specific amount of elapsed time depending on the associated request or data type, or any other type of expiration rules. In one embodiment, the session-level user token manager 504 stores expired session-level user token information in a log (e.g., maintained in the digital data repository 116).

Additionally or alternatively, the session-level user token manager 504 can manage a session-level user token by expiring token information in response to other determinations. For example, the session-level user token manager 504 can expire token information from a session-level user token in response to determining digital data repositories associated with servers of the digital ledger management system 104 are updated (e.g., information is currently mirrored across all, or a threshold number, of the servers of the digital ledger management system 104). In at least one embodiment, the session-level user token manager 504 determines that the servers of the digital ledger management system 104 are fully updated in response to receiving a replication complete notification from the digital ledger management system 104. Accordingly, the session-level user token manager 504 can expire token information from a session-level user token based on tracking server updates across the digital ledger management system 104. For example, the session-level user token manager 504 can generate and maintain one or more mappings (e.g., bitmaps) of where copies of a data object referenced by a session-level user token is stored within the digital ledger management system 104, and which of the storing servers associated with that data object has been updated. In response to determining that all (or a threshold percentage/number) of the storing servers associated with that data object within the digital ledger management system 104 have been updated, the session-level user token manager 504 can expire the information associated with the digital object from the session-level user token.

As mentioned above, the session-level user token manager 504 can also manage session-level user token size by modifying granularity of data blocks corresponding to different versions. For example, as mentioned above, the digital ledger management system 104 may store and access digital objects in groups. Accordingly, the session-level user token manager 504 can expire token information associated with a data object referenced by a session-level user token in response to determining that a data group associated with the data object within the digital ledger management system 104 is up-to-date.

As mentioned above, and as shown in FIG. 5, the data consistency system 106 includes the consistency verification manager 506. In one or more embodiments, the consistency verification manager 506 performs a consistency verification between digital data identified on a server of the digital ledger management system 104 and information stored in a session-level user token. For example, as discussed above with regard to FIGS. 4A and 4B, the consistency verification manager 506 determines whether a version identifier for digital data at a server corresponds with a write-data version indicated by a session-level user token. If the version identifier and the write-data version correspond, the consistency verification manager 506 can provide the digital data. If the version identifier and the write-data version do not correspond, the consistency verification manager 506 can perform the consistency verification again at a second time (e.g., after threshold amount of time, after threshold number of computational signals, after receiving a notification of a server update) to account for mirroring latency across the servers of the digital ledger management system 104. In at least one embodiment, the consistency verification manager 506 operates under a heuristic that digital data is not provided to a client computing device unless the version identifier of the digital data corresponds to the write-data version indicated by the session-level user token associated with that client computing device.

Each of the components 502-506 of the data consistency system 106 can include software, hardware, or both. For example, the components 502-506 can include one or more instructions stored on a computer-readable storage medium and executable by processors of one or more computing devices, such as a client device or server device. When executed by the one or more processors, the computer-executable instructions of the data consistency system 106 can cause the computing device(s) to perform the methods described herein. Alternatively, the components 502-506 can include hardware, such as a special-purpose processing device to perform a certain function or group of functions. Alternatively, the components 502-506 of the data consistency system 106 can include a combination of computer-executable instructions and hardware.

Furthermore, the components 502-506 of the data consistency system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 502-506 of the data consistency system 106 may be implemented as a stand-alone application, such as a desktop or mobile application. Furthermore, the components 502-506 of the data consistency system 106 may be implemented as one or more web-based applications hosted on a remote server. Alternatively, or additionally, the components 502-506 of the data consistency system 106 may be implemented in a suite of mobile device applications or "apps."

Figure 6:
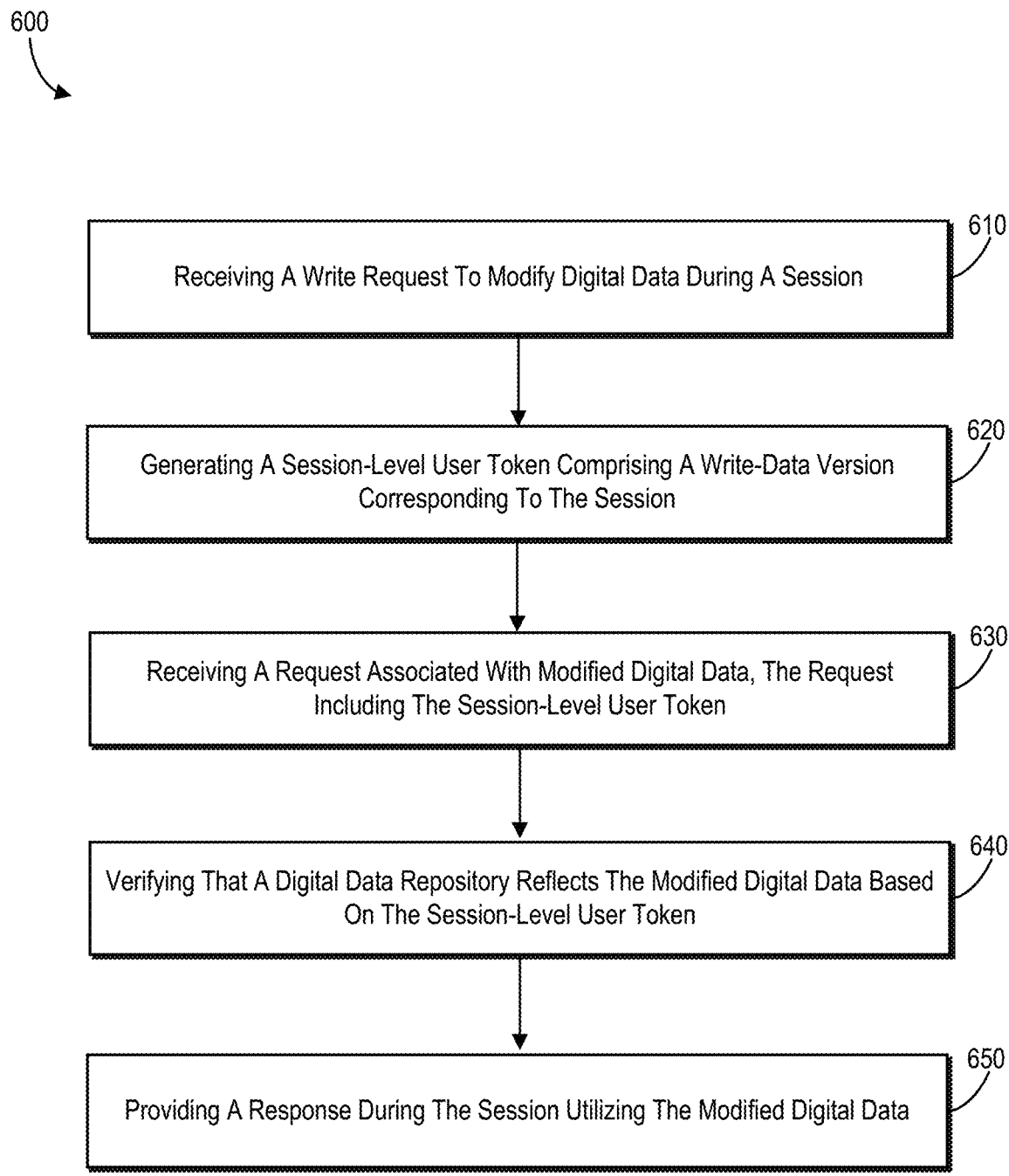
FIG. 6 illustrates a flowchart of a series of acts for providing a response to a client computing device during a session utilizing modified digital data in accordance with one or more embodiments.

FIGS. 1-5, the corresponding text and the examples provide a number of different methods, systems, devices, and non-transitory computer-readable media of the data consistency system 106. In addition to the foregoing, one or more embodiments can also be described in terms of flowcharts comprising acts for accomplishing particular results, as shown in FIG. 6. FIG. 6 may be performed with more or fewer acts. Further, the acts shown in FIG. 6 may be performed in different orders. Additionally, the acts described in FIG. 6 may be repeated or performed in parallel with one another or in parallel with different instances of the same or similar acts.

For example, FIG. 6 illustrates a flowchart of a series of acts 600 for providing a response to a client computing device during a session utilizing modified digital data in accordance with one or more embodiments. While FIG. 6 illustrates acts according to one embodiment, alternative embodiments may omit, add to, reorder, and/or modify any of the acts shown in FIG. 6. In some implementations, the acts of FIG. 6 are performed as part of a method. Alternatively, a non-transitory computer-readable medium can store instructions thereon that, when executed by at least one processor, cause a computing device to perform the acts of FIG. 6. In some embodiments, a system performs the acts of FIG. 6. For example, in one or more embodiments, a system includes at least one processor. The system can further include a non-transitory computer-readable medium comprising instructions that, when executed by the at least one processor, cause the system to perform the acts of FIG. 6.

The series of acts 600 includes an act 610 of receiving a write request to modify digital data during a session. For example, the act 610 can involve, receiving, at a first server from a client computing device participating in a session, a write request to modify digital data.

The series of acts 600 includes an act 620 of generating a session-level user token comprising a write-data version corresponding to the session. In one or more embodiments, the series of acts 600 further includes, in response to generating the session-level user token, providing the session-level user token to the client computing device; and receiving, at the second server, the session-level user token with the request from the client computing device.

Additionally or alternatively, the series of acts 600 further includes, in response to generating the session-level user token, providing the session-level user token to a request routing server. The series of acts 600 can further include receiving, at the second server via the client computing device, the request for the modified digital data by: receiving, at the request routing server, the request for the modified digital data from the client device; combining, at the request routing server, the request and the session-level user token; and routing the request with the session-level user token from the request routing server to the second server.

The series of acts 600 includes an act 630 of receiving a request associated with modified digital data, the request including the session-level user token. For example, the act 630 can involve receiving, at a second server via the client computing device participating in the session, a request associated with the modified digital data, the request comprising the session-level user token. In one or more embodiments, receiving the request at the second server via the client computing device can include receiving the request at the second server originating at the client computing device and then routed through another server (e.g., such as the request routing server 206).

The series of acts 600 includes an act 640 of verifying that a digital data repository reflects the modified digital data based on the session-level user token. For example, the act 640 can involve utilizing the write-data version of the session-level user token to verify that a digital data repository of the second server reflects the modified digital data. In one or more embodiments, utilizing the write-data version of the session-level user token to verify that the digital data repository of the second server reflects the modified digital data includes comparing the write-data version of the session-level user token with a version identifier of the digital data repository of the second server.

Additionally or alternatively, utilizing the write-data version of the session-level user token to verify that the digital data repository of the second server reflects the modified digital data can include: determining, at a first time based on comparing the write-data version of the session-level user token with a version identifier of the digital repository, that the digital data repository of the second server does not reflect the modified digital data; updating the digital data repository and identifying an updated version identifier of the digital data repository; and determining, at a second time based on comparing the write-data version of the session-level user to the updated version identifier, that the digital data repository reflects the modified digital data.

The series of acts 600 includes an act 650 of providing a response during the session utilizing the modified digital data. For example, the act 650 can involve providing a response to the client computing device during the session utilizing the modified digital data. In one or more embodiments, the series of acts 600 include acts of receiving, at an additional server from the client computing device participating in the session, an additional write request to modify additional digital data; and updating the session-level user token with an updated write-data version corresponding to the session. Additionally, the series of acts 600 can further include acts of receiving, at one or more servers via the client computing device participating in the session, a second request for the modified additional digital data; and utilizing the updated write-data version of the updated session-level user token to verify that the digital data repository of the second server reflects the further modified digital data.

Moreover, in at least one embodiment, the series of acts 600 can further include determining that an amount of time since receiving the write request satisfies expiration criteria. Additionally, the series of acts 600 can also include determining expiration criteria associated with the session-level user token is satisfies by determining that a set of digital data repositories are updated. The series of acts 600 can also include removing the write-data version from the session-level user token based on determining that the write-data version has expired. Additionally or alternatively, the series of acts 600 can further include removing the write-data version from the session-level user token based on determining that the expiration criteria is satisfied.

In one or more embodiments, the write request includes a digital asset transaction request for a distributed digital ledger maintained by a distributed digital ledger network. For example, the series of acts 600 can further include:

transmitting the digital asset transaction request to the distributed digital ledger to generate the modified digital data; and providing the response to the client computing device during the session utilizing the modified digital data reflecting the digital asset transaction request for the distributed digital ledger to the client computing device.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
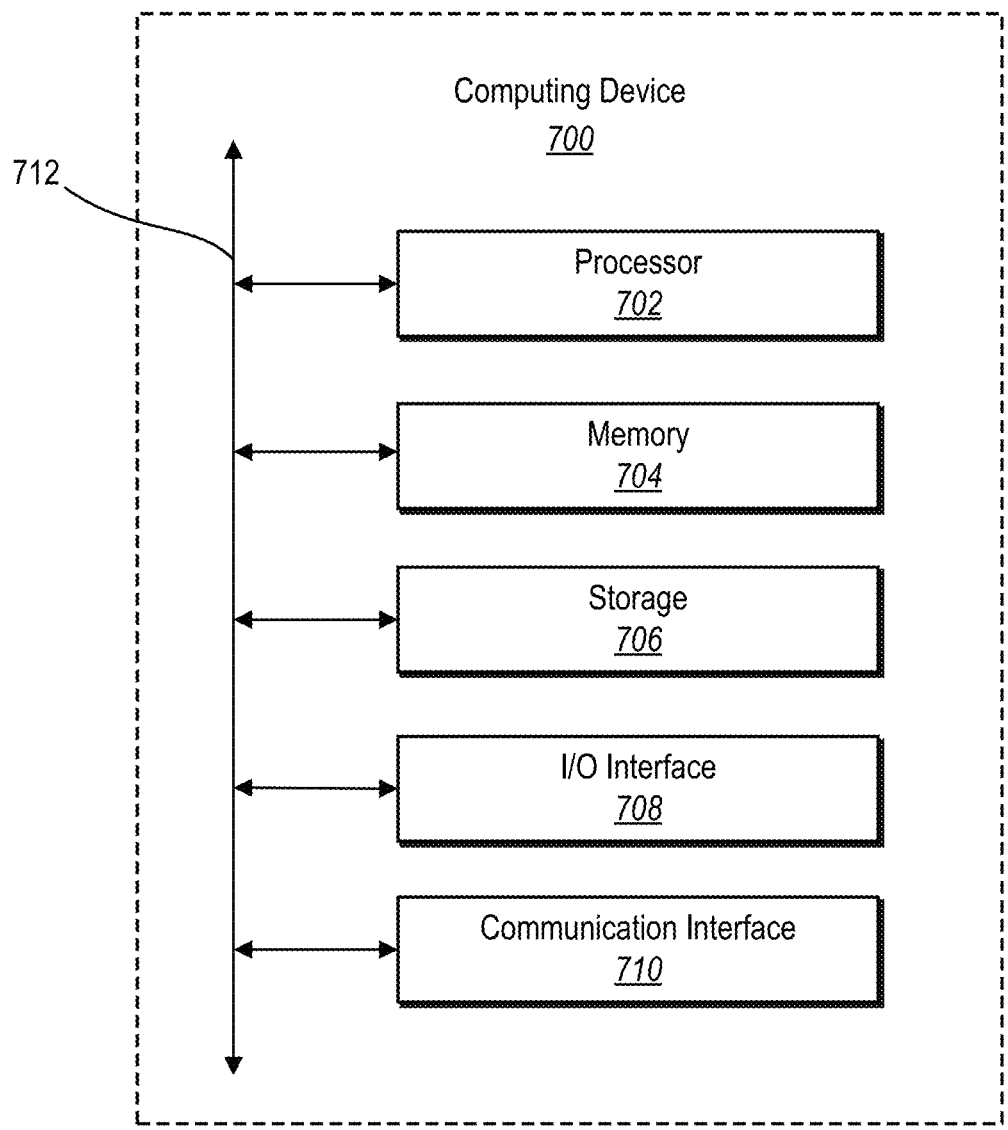
FIG. 7 illustrates a block diagram of an exemplary computing device in accordance with one or more embodiments.

FIG. 7 illustrates a block diagram of an example computing device 700 that may be configured to perform one or more of the processes described above. One will appreciate that one or more computing devices, such as the computing device 700 may represent the computing devices described above (e.g., the server(s) 102, the client computing devices 108a-108n, and/or the computing devices of the distributed digital ledger transaction network 112). In one or more embodiments, the computing device 700 may be a mobile device (e.g., a mobile telephone, a smartphone, a PDA, a tablet, a laptop, a camera, a tracker, a watch, a wearable device). In some embodiments, the computing device 700 may be a non-mobile device (e.g., a desktop computer or another type of client device). Further, the computing device 700 may be a server device that includes cloud-based processing and storage capabilities.

As shown in FIG. 7, the computing device 700 can include one or more processor(s) 702, memory 704, a storage device 706, input/output interfaces 708 (or "I/O interfaces 708"), and a communication interface 710, which may be communicatively coupled by way of a communication infrastructure (e.g., bus 712). While the computing device 700 is shown in FIG. 7, the components illustrated in FIG. 7 are not intended to be limiting. Additional or alternative components may be used in other embodiments. Furthermore, in certain embodiments, the computing device 700 includes fewer components than those shown in FIG. 7. Components of the computing device 700 shown in FIG. 7 will now be described in additional detail.

In particular embodiments, the processor(s) 702 includes hardware for executing instructions, such as those making up a computer program. As an example, and not by way of limitation, to execute instructions, the processor(s) 702 may retrieve (or fetch) the instructions from an internal register, an internal cache, memory 704, or a storage device 706 and decode and execute them.

The computing device 700 includes memory 704, which is coupled to the processor(s) 702. The memory 704 may be used for storing data, metadata, and programs for execution by the processor(s). The memory 704 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 704 may be internal or distributed memory.

The computing device 700 includes a storage device 706 including storage for storing data or instructions. As an example, and not by way of limitation, the storage device 706 can include a non-transitory storage medium described above. The storage device 706 may include a hard disk drive (HDD), flash memory, a Universal Serial Bus (USB) drive or a combination these or other storage devices.

As shown, the computing device 700 includes one or more I/O interfaces 708, which are provided to allow a user to provide input to (such as user strokes), receive output from, and otherwise transfer data to and from the computing device 700. These I/O interfaces 708 may include a mouse, keypad or a keyboard, a touch screen, camera, optical scanner, network interface, modem, other known I/O devices or a combination of such I/O interfaces 708. The touch screen may be activated with a stylus or a finger.

The I/O interfaces 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 708 are configured to provide graphical data to a display for presentation to a user. The graphical data may be representative of one or more graphical user interfaces and/or any other graphical content as may serve a particular implementation.

The computing device 700 can further include a communication interface 710. The communication interface 710 can include hardware, software, or both. The communication interface 710 provides one or more interfaces for communication (such as, for example, packet-based communication) between the computing device and one or more other computing devices or one or more networks. As an example, and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI. The computing device 700 can further include a bus 712. The bus 712 can include hardware, software, or both that connects components of computing device 700 to each other.

As mentioned above, the data consistency system 106 can be implemented as part of (or including) a networking system. In one or more embodiments, the networking system comprises a social networking system. In addition to the description given above, a social networking system may enable its users (such as persons or organizations) to interact with the system and with each other. The social networking system may, with input from a user, create and store in the social networking system a user profile associated with the user. The user profile may include demographic information, communication-channel information, and information on personal interests of the user. The social networking system may also, with input from a user, create and store a record of relationships of the user with other users of the social networking system, as well as provide services (e.g., posts, photo-sharing, event organization, messaging, games, or advertisements) to facilitate social interaction between or among users.

The social networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social networking system. A user may be an individual (human user), an entity (e.g., an enterprise, business, or third party application), or a group (e.g., of individuals or entities). A user node corresponding to a user may comprise information provided by the user and information gathered by various systems, including the social networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a username, the social networking system can access a user node corresponding to the username, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social networking system may construct a web page (or a structured document) of a concept node (e.g., a restaurant, a celebrity), incorporating one or more selectable option or selectable elements (e.g., "like", "check in") in the web page. A user can access the page using a web browser hosted by the user's client device and select a selectable option or selectable element, causing the client device to transmit to the social networking system a request to create an edge between a user node of the user and a concept node of the concept, indicating a relationship between the user and the concept (e.g., the user checks in a restaurant, or the user "likes" a celebrity).

As an example, a user may provide (or change) his or her city of residence, causing the social networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social networking system may support a variety of applications, such as photo sharing, on-line calendars and events, gaming, instant messaging, and advertising. For example, the social networking system may also include media sharing capabilities. Also, the social networking system may allow users to post photographs and other multimedia content items to a user's profile page (typically known as "wall posts" or "timeline posts") or in a photo album, both of which may be accessible to other users of the social networking system depending upon the user's configured privacy settings. The social networking system may also allow users to configure events. For example, a first user may configure an event with attributes including time and date of the event, location of the event and other users invited to the event. The invited users may receive invitations to the event and respond (such as by accepting the invitation or declining it). Furthermore, the social networking system may allow users to maintain a personal calendar. Similarly to events, the calendar entries may include times, dates, locations and identities of other users.

Figure 8:
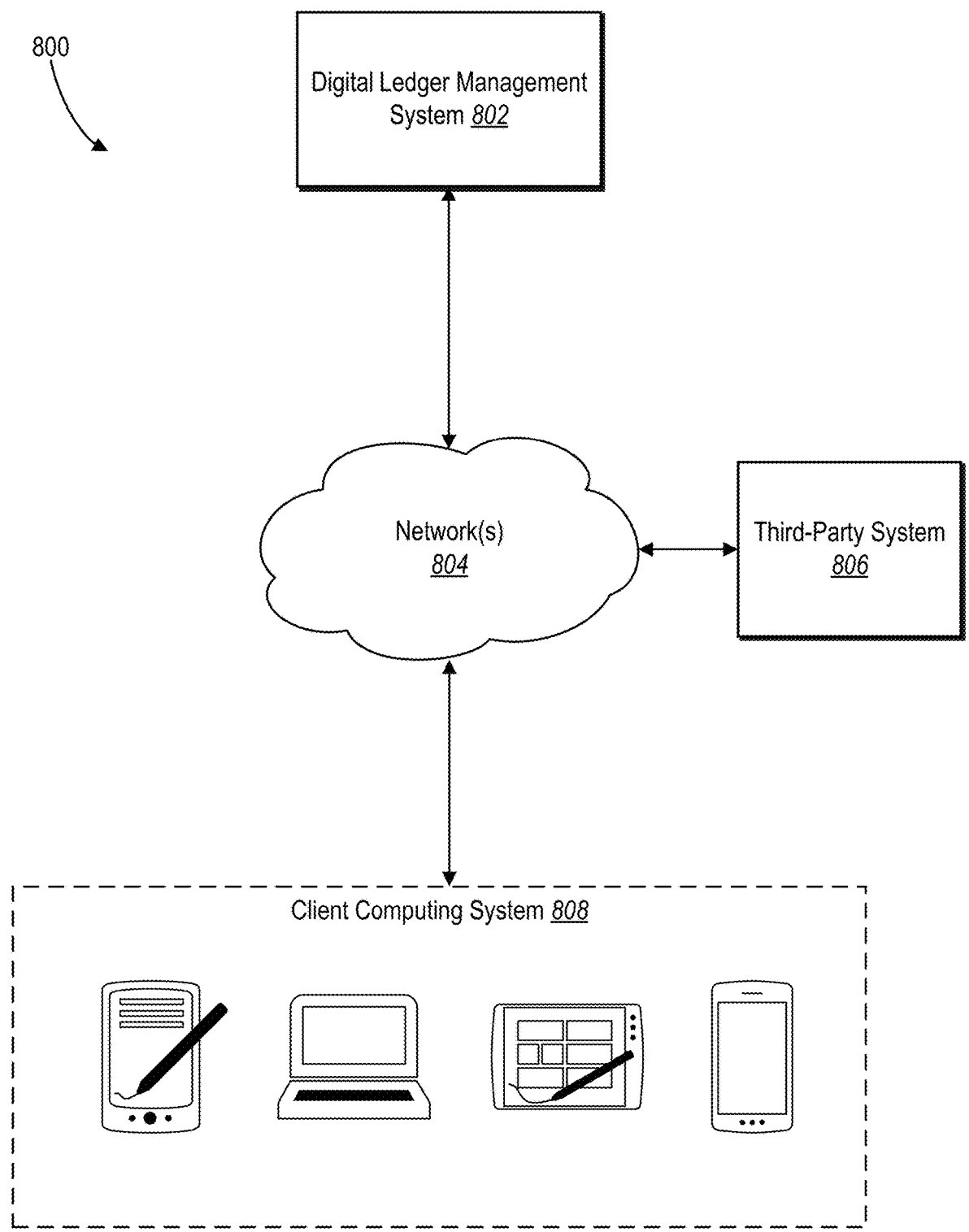
FIG. 8 is an example network environment of digital ledger management system in accordance with one or more embodiments.

FIG. 8 illustrates an example network environment 800 of a digital ledger management system 802. Network environment 800 includes a client system 808, a digital ledger management system 802 (e.g., the digital ledger management system 104), and a third-party system 806 connected to each other by a network 804. Although FIG. 8 illustrates a particular arrangement of the client system 808, digital ledger management system 802, third-party system 806, and network 804, this disclosure contemplates any suitable arrangement of the client system 808, digital ledger management system 802, third-party system 806, and network 804. As an example and not by way of limitation, two or more of client system 808, digital ledger management system 802, and third-party system 806 may be connected to each other directly, bypassing network 804. As another example, two or more of the client system 808, digital ledger management system 802, and third-party system 806 may be physically or logically co-located with each other in whole or in part. Moreover, although FIG. 8 illustrates a particular number of client systems 808, networking systems 802, third-party systems 806, and networks 804, this disclosure contemplates any suitable number of client systems 808, digital ledger management system 802, third-party systems 806, and networks 804. As an example and not by way of limitation, network environment 800 may include multiple client systems 808, digital ledger management system 802, third-party systems 806, and networks 804.

This disclosure contemplates any suitable network 804. As an example and not by way of limitation, one or more portions of network 804 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 804 may include one or more networks 804.

Links may connect the client system 808, digital ledger management system 802, and third-party system 806 to communication network 804 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 800. One or more first links may differ in one or more respects from one or more second links.

In particular embodiments, the client system 808 may be an electronic device including hardware, software, or embedded logic components or a combination of two or more such components and capable of carrying out the appropriate functionalities implemented or supported by the client system 808. As an example and not by way of limitation, a client system 808 may include a computer system such as an augmented reality display device, a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 808. A client system 808 may enable a network user at the client system 808 to access network 804. A client system 808 may enable its user to communicate with other users at other client computing devices 808.

In particular embodiments, the client system 808 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client system 808 may enter a Uniform Resource Locator (URL) or other address directing the web browser to a particular server (such as server, or a server associated with a third-party system 806), and the web browser may generate a Hyper Text Transfer Protocol (HTTP) request and communicate the HTTP request to server. The server may accept the HTTP request and communicate to the client system 808 one or more Hyper Text Markup Language (HTML) files responsive to the HTTP request. The client system 808 may render a webpage based on the HTML files from the server for presentation to the user. This disclosure contemplates any suitable webpage files. As an example, and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, a third-party system 806 may include one or more types of servers, one or more data stores, one or more interfaces, including but not limited to APIs, one or more web services, one or more content sources, one or more networks, or any other suitable components, e.g., that servers may communicate with. A third-party system 806 may be operated by a different entity from an entity operating digital ledger management system 802. In particular embodiments, however, digital ledger management system 802 and third-party systems 806 may operate in conjunction with each other to provide social-networking services to users of digital ledger management system 802 or third-party systems 806. In this sense, digital ledger management system 802 may provide a platform, or backbone, which other systems, such as third-party systems 806, may use to provide social-networking services and functionality to users across the Internet.

In particular embodiments, a third-party system 806 may include a third-party content object provider. A third-party content object provider may include one or more sources of content objects, which may be communicated to a client system 808. As an example, and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, digital ledger management system 802 may include a variety of servers, sub-systems, programs, modules, logs, and data stores. In particular embodiments, digital ledger management system 802 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The digital ledger management system 802 may also include suitable components such as network interfaces, security mechanisms, load balancers, failover servers, management-and-network-operations consoles, other suitable components, or any suitable combination thereof. In particular embodiments, digital ledger management system 802 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking digital ledger management system 802 to one or more client system 808 or one or more third-party system 806 via network 804. The web server may include a mail server or other messaging functionality for receiving and routing messages between digital ledger management system 802 and one or more client systems 808. An API-request server may allow a third-party system 806 to access information from the digital ledger management system 802 by calling one or more APIs. An action logger may be used to receive communications from a web server about a user's actions on or off digital ledger management system 802. In conjunction with the action log, a third-party-content-object log may be maintained of user exposures to third-party-content objects. A notification controller may provide information regarding content objects to a client system 808. Information may be pushed to a client system 808 as notifications, or information may be pulled from client system 808 responsive to a request received from client system 808. Authorization servers may be used to enforce one or more privacy settings of the users of digital ledger management system 802. A privacy setting of a user determines how particular information associated with a user can be shared. The authorization server may allow users to opt in to or opt out of having their actions logged by digital ledger management system 802 or shared with other systems (e.g., third-party system 806), such as, for example, by setting appropriate privacy settings. Third-party-content-object stores may be used to store content objects received from third parties, such as a third-party system 806. Location stores may be used for storing location information received from client system 808 associated with users. Advertisement-pricing modules may combine social information, the current time, location information, or other suitable information to provide relevant advertisements, in the form of notifications, to a user.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   receiving, at a first server from a client computing device participating in a session, a write request to modify digital data;
   generating a session-level user token comprising a write-data version corresponding to the session;
   receiving during the session, at a second server via the client computing device participating in the session, a request to utilize the modified digital data, the request comprising the session-level user token;
   utilizing the write-data version of the session-level user token to verify that a digital data repository of the second server reflects the modified digital data;
   providing a response to the client computing device during the session utilizing the modified digital data; and
   expiring the session-level user token in response to determining that the session has ended or detecting satisfaction of a threshold update status of the digital data across a plurality of servers during the session.

2. The computer-implemented method as recited in claim 1, wherein utilizing the write-data version of the session-level user token to verify that the digital data repository of the second server reflects the modified digital data comprises, during the session, comparing the write-data version of the session-level user token with a version identifier of the digital data repository of the second server.

3. The computer-implemented method as recited in claim 2, wherein utilizing the write-data version of the session-level user token to verify that the digital data repository of the second server reflects the modified digital data comprises:
   determining, at a first time within the session based on comparing the write-data version of the session-level user token with a version identifier of the digital data repository, that the digital data repository of the second server does not reflect the modified digital data;
   updating the digital data repository and identifying an updated version identifier of the digital data repository; and
   determining, at a second time within the session based on comparing the write-data version of the session-level user token to the updated version identifier, that the digital data repository reflects the modified digital data.

4. The computer-implemented method as recited in claim 3, further comprising:
   in response to generating the session-level user token, providing the session-level user token to the client computing device; and
   receiving, at the second server during the session, the session-level user token with the request from the client computing device.

5. The computer-implemented method as recited in claim 1, further comprising:
   in response to generating the session-level user token, providing the session-level user token to a request routing server; and
   receiving, at the second server via the client computing device during the session, the request for the modified digital data by:
      receiving, at the request routing server, the request for the modified digital data from the client computing device;
      combining, at the request routing server, the request and the session-level user token; and
      routing the request with the session-level user token from the request routing server to the second server.

6. The computer-implemented method as recited in claim 1, further comprising:
   receiving, at an additional server from the client computing device participating in the session, an additional write request to modify additional digital data; and
   updating the session-level user token with an updated write-data version corresponding to the session.

7. The computer-implemented method as recited in claim 6, further comprising:
   receiving, at one or more servers via the client computing device participating in the session, a second request for the modified additional digital data; and
   utilizing the updated write-data version of the updated session-level user token to verify that a digital data repository of the one or more servers reflects the modified additional digital data.

8. The computer-implemented method as recited in claim 1, further comprising:
   determining that an amount of time since receiving the write request satisfies expiration criteria; and
   removing the write-data version from the session-level user token based on determining that the write-data version has expired.

9. The computer-implemented method as recited in claim 1, further comprising: receiving, at a server from the client computing device participating in a second session, a second write request to modify digital data; and
   generating a second session-level user token corresponding to the second session of the client computing device.

10. The computer-implemented method as recited in claim 1,
   wherein the write request comprises a digital asset transaction request for a distributed digital ledger maintained by a distributed digital ledger network; and
   further comprising:
      transmitting the digital asset transaction request to the distributed digital ledger to generate the modified digital data; and
      providing the response to the client computing device during the session utilizing the modified digital data reflecting the digital asset transaction request for the distributed digital ledger to the client computing device.

11. A system comprising:
   at least one processor; and at least one non-transitory computer-readable storage medium storing instructions thereon that, when executed by the at least one processor, cause the system to:
- receive, at a first server from a client computing device participating in a session, a write request to modify digital data;
- generate a session-level user token comprising a write-data version corresponding to the session;
- receive, during the session and at a second server via the client computing device participating in the session, a request to utilize the modified digital data, the request comprising the session-level user token;
- utilize the write-data version of the session-level user token to verify that a digital data repository of the second server reflects the modified digital data;
- provide a response to the client computing device during the session utilizing the modified digital data; and
- expire the session-level user token in response to determining that the session has ended or detecting satisfaction of a threshold update status of the digital data across a plurality of servers during the session.

12. The system as recited in claim 11, further storing instructions thereon that, when executed by the at least one processor, cause the system to utilize the write-data version of the session-level user token to verify that the digital data repository of the second server reflects the modified digital data by comparing, during the session, the write-data version of the session-level user token with a version identifier of the digital data repository of the second server.

13. The system as recited in claim 12, further storing instructions thereon that, when executed by the at least one processor, cause the system to utilize the write-data version of the session-level user token to verify that the digital data repository of the second server reflects the modified digital data by:
- determining, at a first time within the session based on comparing the write-data version of the session-level user token with a version identifier of the digital data repository, that the digital data repository of the second server does not reflect the modified digital data;
- updating the digital data repository and identifying an updated version identifier of the digital data repository; and
- determining, at a second time within the session based on comparing the write-data version of the session-level user token to the updated version identifier, that the digital data repository reflects the modified digital data.

14. The system as recited in claim 13, further storing instructions thereon that, when executed by the at least one processor, cause the system to:
- in response to generating the session-level user token, provide the session-level user token to the client computing device; and
- receive, at the second server during the session, the session-level user token with the request from the client computing device.

15. The system as recited in claim 11, further storing instructions thereon that, when executed by the at least one processor, cause the system to:
- in response to generating the session-level user token, provide the session-level user token to a request routing server; and
- receive, at the second server via the client computing device during the session, the request for the modified digital data by:
  - receiving, at the request routing server, the request for the modified digital data from the client computing device;
  - combining, at the request routing server, the request and the session-level user token; and
  - routing the request with the session-level user token from the request routing server to the second server.

16. The system as recited in claim 11, further storing instructions thereon that, when executed by the at least one processor, cause the system to:
- receive, at an additional server from the client computing device participating in the session, an additional write request to modify additional digital data; and
- update the session-level user token with an updated write-data version corresponding to the session.

17. The system as recited in claim 16, further storing instructions thereon that, when executed by the at least one processor, cause the system to:
- receive, at one or more servers via the client computing device participating in the session, a second request for the modified additional digital data; and
- utilize the updated write-data version of the updated session-level user token to verify that a digital data repository of the one or more servers reflects the modified digital data.

18. The system as recited in claim 11, further storing instructions thereon that, when executed by the at least one processor, cause the system to:
- determine that an amount of time since receiving the write request satisfies expiration criteria; and
- remove the write-data version from the session-level user token based on determining that the write-data version has expired.

19. A non-transitory computer-readable medium comprising instructions that, when executed by at least one processor, cause a computing device to:
- receive, at a first server from a client computing device participating in a session, a write request to modify digital data;
- generate a session-level user token comprising a write-data version corresponding to the session;
- receive, during the session and at a second server via the client computing device participating in the session, a request to utilize the modified digital data, the request comprising the session-level user token;
- utilize the write-data version of the session-level user token to verify that a digital data repository of the second server reflects the modified digital data;
- provide a response to the client computing device during the session utilizing the modified digital data; and
- expire the session-level user token in response to determining that the session has ended or detecting satisfaction of a threshold update status of the digital data across a plurality of servers during the session.

20. The non-transitory computer-readable medium as recited in claim 19,
- wherein the write request comprises a digital asset transaction request for a distributed digital ledger maintained by a distributed digital ledger network; and
- further comprising instructions that, when executed by the at least one processor, cause the computing device to:
  - transmit the digital asset transaction request to the distributed digital ledger to generate the modified digital data; and
  - provide the response to the client computing device during the session utilizing the modified digital data reflecting the digital asset transaction request for the distributed digital ledger to the client computing device.

\* \* \* \* \*